(12) United States Patent
Beaty et al.

(10) Patent No.: US 9,473,374 B2
(45) Date of Patent: *Oct. 18, 2016

(54) INTEGRATED METERING OF SERVICE USAGE FOR HYBRID CLOUDS

(71) Applicant: International Business Machines Corporation, Armonk, NY (US)

(72) Inventors: Kirk A. Beaty, Goldens Bridge, NY (US); John G. Buckley, Cork (IE); Yasuharu Katsuno, Chigasaki (JP); Ashish Kundu, Elmsford, NY (US); Vijay K. Naik, Pleasantville, NY (US); Julia L. O'Halloran, Cork (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,955

(22) Filed: Feb. 26, 2016

(65) Prior Publication Data

US 2016/0182334 A1    Jun. 23, 2016

Related U.S. Application Data

(62) Division of application No. 13/350,752, filed on Jan. 14, 2012, now Pat. No. 9,336,061.

(51) Int. Cl.
*G06F 15/173* (2006.01)
*H04L 12/26* (2006.01)
(Continued)

(52) U.S. Cl.
CPC ....... *H04L 43/0876* (2013.01); *H04L 41/0806* (2013.01); *H04L 43/06* (2013.01);
(Continued)

(58) Field of Classification Search
CPC ........... H04L 43/0876; H04L 67/1002; H04L 67/20; H04L 43/06; H04L 41/0806; G06F 9/5077; G06F 11/3006
See application file for complete search history.

(56) References Cited

U.S. PATENT DOCUMENTS 6,421,737 B1    7/2002    Stone et al.
6,473,794 B1    10/2002    Guheen et al.
(Continued)

OTHER PUBLICATIONS

"Cloud Computing," National Institute of Standards and Technology, http://csrc.nist.gov/groups/SNS/cloud-computing/index.html, created May 11, 2009, accessed May 11, 2011, 1 page.
(Continued)

*Primary Examiner* — Krista Zele
*Assistant Examiner* — James Forman
(74) *Attorney, Agent, or Firm* — Yee & Associates, P.C.; Louis Percello

(57) ABSTRACT

A hybrid cloud environment is provided where a user of cloud computing services is disposed to consume cloud provided services delivered by each of a plurality of cloud computing service providers. Specified event data is received at an MCS component. The event data pertains to metering events related to the cloud provided services delivered by one or more cloud service providers. Event data include event data furnished by one or more entities that actively monitor metering events at one or more local or remote cloud service provider locations. Event data are sent from the MCS component to a metering system. The metering system generates reports from the event data that contains usage information on services provided by one or more cloud service providers. Information for a provider specifies amounts and quality of each type of service delivered to users by the provider.

12 Claims, 12 Drawing Sheets

(51) Int. Cl.
*H04L 29/08* (2006.01)
*H04L 12/24* (2006.01)
*G06F 9/50* (2006.01)
*G06F 11/30* (2006.01)

(52) U.S. Cl.
CPC ........... *H04L67/1002* (2013.01); *H04L 67/20* (2013.01); *G06F 9/5077* (2013.01); *G06F 11/3006* (2013.01)

(56) References Cited

U.S. PATENT DOCUMENTS

| | | | |
|---|---|---|---|
| 7,467,198 | B2 | 12/2008 | Goodman et al. |
| 7,644,161 | B1 | 1/2010 | Graupner et al. |
| 7,953,425 | B2 | 5/2011 | Jordan |
| 7,996,455 | B2 | 8/2011 | Jackson |
| 8,745,361 | B2 | 6/2014 | Shah et al. |
| 8,988,998 | B2 | 3/2015 | Adam et al. |
| 9,009,697 | B2 | 4/2015 | Breiter et al. |
| 9,053,580 | B2 | 6/2015 | Adam et al. |
| 9,063,789 | B2 | 6/2015 | Beaty et al. |
| 9,104,672 | B2 | 8/2015 | Beaty et al. |
| 9,128,773 | B2 | 9/2015 | Beaty et al. |
| 2003/0009547 | A1 | 1/2003 | Benfield et al. |
| 2004/0240408 | A1 | 12/2004 | Gur |
| 2005/0254421 | A1 | 11/2005 | Galou et al. |
| 2006/0215650 | A1 | 9/2006 | Wollmershauser et al. |
| 2007/0076312 | A1 | 4/2007 | Jordan |
| 2007/0134069 | A1 | 6/2007 | Smith et al. |
| 2008/0022384 | A1 | 1/2008 | Yee et al. |
| 2008/0244579 | A1 | 10/2008 | Muller |
| 2009/0063869 | A1 | 3/2009 | Kohavi et al. |
| 2009/0113392 | A1 | 4/2009 | Wijenayake et al. |
| 2009/0199193 | A1 | 8/2009 | Jackson |
| 2009/0271472 | A1 | 10/2009 | Scheifler et al. |
| 2009/0307705 | A1 | 12/2009 | Bogner |
| 2009/0328221 | A1 | 12/2009 | Blumfield et al. |
| 2010/0023949 | A1 | 1/2010 | Jackson |
| 2010/0042670 | A1 | 2/2010 | Kamalakantha et al. |
| 2010/0042720 | A1* | 2/2010 | Stienhans ............. G06F 9/5072 709/226 |
| 2010/0192170 | A1 | 7/2010 | Raleigh |
| 2010/0199267 | A1 | 8/2010 | Rolia et al. |
| 2010/0250746 | A1 | 9/2010 | Murase |
| 2010/0292857 | A1 | 11/2010 | Bose et al. |
| 2011/0004654 | A1 | 1/2011 | Tasa et al. |
| 2011/0016214 | A1 | 1/2011 | Jackson |
| 2011/0055378 | A1* | 3/2011 | Ferris .................. G06F 11/3419 709/224 |
| 2011/0126047 | A1 | 5/2011 | Anderson et al. |
| 2011/0131504 | A1 | 6/2011 | Shustef |
| 2011/0145413 | A1 | 6/2011 | Dawson et al. |
| 2011/0208606 | A1 | 8/2011 | Hadar |
| 2011/0231899 | A1 | 9/2011 | Pulier et al. |
| 2011/0289329 | A1 | 11/2011 | Bose et al. |
| 2012/0005584 | A1* | 1/2012 | Seago ...................... G06F 11/32 715/738 |
| 2012/0023221 | A1 | 1/2012 | Dayan |
| 2012/0030341 | A1 | 2/2012 | Jensen et al. |
| 2012/0036249 | A1 | 2/2012 | Chandrasekaran |
| 2012/0054763 | A1 | 3/2012 | Srinivasan |
| 2012/0084438 | A1* | 4/2012 | Raleigh ................. H04L 41/046 709/224 |
| 2012/0096320 | A1 | 4/2012 | Caffrey |
| 2012/0110044 | A1 | 5/2012 | Nagpal et al. |
| 2012/0124211 | A1* | 5/2012 | Kampas ...................... G06F 9/50 709/226 |
| 2012/0159337 | A1 | 6/2012 | Travilla et al. |
| 2012/0166992 | A1 | 6/2012 | Huynh et al. |
| 2012/0185913 | A1 | 7/2012 | Martinez et al. |
| 2012/0203908 | A1 | 8/2012 | Beaty et al. |
| 2012/0204169 | A1 | 8/2012 | Breiter et al. |
| 2012/0204187 | A1 | 8/2012 | Breiter et al. |
| 2012/0221690 | A1 | 8/2012 | Beaty et al. |
| 2012/0222084 | A1 | 8/2012 | Beaty et al. |
| 2012/0239722 | A1 | 9/2012 | Bolosky et al. |
| 2012/0272249 | A1 | 10/2012 | Beaty et al. |
| 2013/0069950 | A1 | 3/2013 | Adam et al. |
| 2013/0080642 | A1 | 3/2013 | Adam et al. |
| 2013/0185413 | A1 | 7/2013 | Beaty et al. |

OTHER PUBLICATIONS

"On-Demand Identity Management for All Your Web Applications," Okta Cloud Services Platform, Okta, Inc., copyright 2011, 2 pages, accessed May 21, 2013. http://web.archive.org/web/20110206225912/http://www.okta.com/products/.
"Vordel Cloud Service Broker Features," Vordel Limited, copyright 1999-2011, 1 pages, accessed May 21, 2013, http://web.archive.org/web/20110926081542/http://www.vordel.com/products/cloud_service_broker/features.html.
"WebSphere Cast Iron Cloud Integration," IBM CastIron Solution, IBM, May 2011, 2 pages, accesed May 21, 2013 http://web.archive.org/web/20110504214512/http://www-01.ibm.com/software/integration/cast-iron-cloud-integration/.
Mell et al., "The NIST Definition of Cloud Computing (Draft), Recommendations of the National Institute of Standards and Technology," Jan. 2011, 7 pages.
Mell et al., "The NIST Definition of Cloud Computing," National Institute of Standards and Technology, Information Technology Laboratory, Version 15, Oct. 2009, 2 pages.
Office Action dated Jun. 19, 2014, regarding U.S. Appl. No. 13/023,051, 57 pages.
Notice of Allowance dated Dec. 5, 2014, regarding U.S. Appl. No. 13/023,051, 19 pages.
Non-final Office Action dated Jan. 3, 2013, regarding U.S. Appl. No. 13/023,103, 27 pages.
Final Office Action dated Jun. 14, 2013, regarding U.S. Appl. No. 13/023,103, 35 pages.
Office Action dated Feb. 28, 2014 regarding U.S. Appl. No. 13/023,103, 36 pages.
Notice of Allowance dated Feb. 2, 2015, regarding U.S. Appl. No. 13/023,103, 20 pages.
Office Action dated Mar. 7, 2013, regarding U.S. Appl. No. 13/023,159, 27 pages.
Final Office Action dated Sep. 9, 2013, regarding U.S. Appl. No. 13/023,159, 27 pages.
Notice of Allowance, dated Nov. 25, 2013, regarding U.S. Appl. No. 13/023,159, 16 pages.
Office Action dated Aug. 14, 2014, regarding U.S. Appl. No. 13/358,186, 34 pages.
Final Office Action dated Dec. 23, 2014, regarding U.S. Appl. No. 13/358,186, 20 pages.
Notice of Allowance dated Mar. 27, 2015, regarding U.S. Appl. No. 13/358,186, 14 pages.
Office Action dated Mar. 21, 2014, regarding U.S. Appl. No. 13/400,505, 72 pages.
Office Action dated Mar. 28, 2014, regarding U.S. Appl. No. 13/533,517, 60 pages.
Final Office Action dated Sep. 2, 2014, regarding U.S. Appl. No. 13/533,517, 43 pages.
Notice of Allowance dated May 1, 2015, regarding U.S. Appl. No. 13/533,517, 22 pages.
Office Action dated Sep. 12, 2014, regarding U.S. Appl. No. 13/680,385, 43 pages.
Notice of Allowance dated Nov. 7, 2014, regarding U.S. Appl. No. 13/680,385, 14 pages.
Office Action dated Dec. 3, 2014, regarding U.S. Appl. No. 13/680,485, 52 pages.
Notice of Allowance dated Feb. 2, 2015, regarding U.S. Appl. No. 13/680,485, 9 pages.
Office Action, dated Nov. 13, 2015, regarding U.S. Appl. No. 13/350,752, 76 pages.
Notice of Allowance, dated Feb. 12, 2016, regarding U.S. Appl. No. 13/350,752, 9 pages.

* cited by examiner

FIG. 12
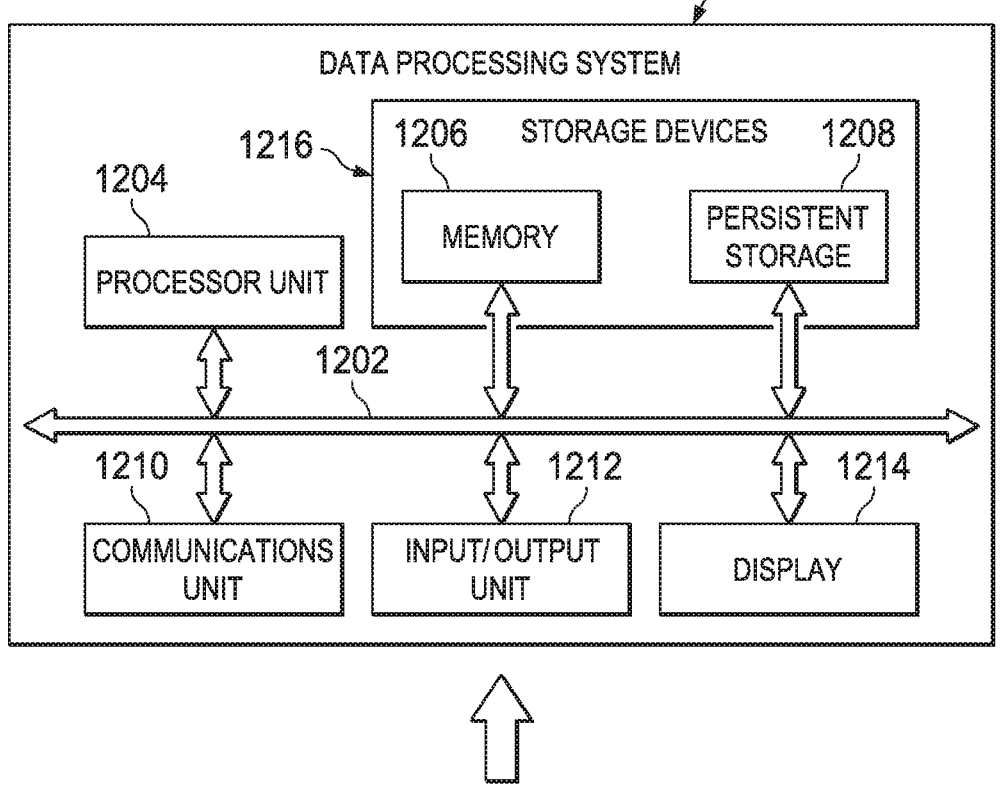
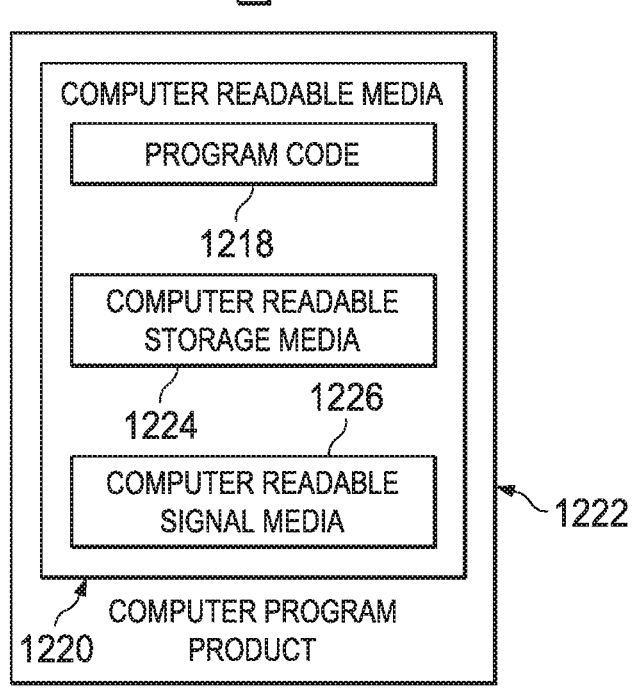

INTEGRATED METERING OF SERVICE USAGE FOR HYBRID CLOUDS

This application is a divisional of prior application Ser. No. 13/350,725, filed Jan. 14, 2012.

BACKGROUND

1. Field

The disclosure relates generally to data processing systems and methods and more specifically to systems and methods for using data processing resources provided as a service, known as cloud computing.

2. Description of the Related Art

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources that can be rapidly provisioned and released with minimal management effort or interaction with a provider of the service. For example, cloud computing allows a consumer to obtain data processing resources, such as networks, network bandwidth, servers, processing, memory, storage, applications, virtual machines, and services as a service on a temporary basis when needed. Several vendors are currently offering various cloud services. For example, such services include infrastructure as a service, platform as a service, storage as a service, software as a service, and business process as a service cloud services. These services use vendor-specific service request, access, and consumption models.

A consumer of cloud computing services may have its own data processing system resources. For example, the consumer may be a business or other entity. The consumer may have invested in its own data processing system resources. These resources may include a computer network. The consumer's computer network provides a limited amount of processing capability and data storage resources. The consumer's computer network also provides specific data processing applications. The consumer's computer network may be located on-premise and may be operated as a private cloud.

At certain times, the consumer may require data processing resources beyond those available in its computer network. For example, at certain times, the demand for data processing resources may outstrip the capability of the consumer's computer network. At these times, the response time of the consumer's computer network for some applications may increase to unacceptable levels. At other times, the consumer may require data processing applications that are not available on the consumer's own computer network. For example, the consumer may require, at times, the use of data processing applications that are not part of the consumer's core competency.

At those times when the consumer requires data processing resources beyond its own, the consumer may purchase such resources as a service on a temporary basis from a provider of cloud computing services. For example, the consumer may obtain additional processing or storage resources or specific application functionality as a service on a temporary basis from the cloud computing provider's data processing resources. Different types of service offerings may provide parts of the solution used in processing the consumer's workload. The provider's available data processing resources is known as a public cloud.

The consumer typically continues to operate its own computer network while some data processing resources are being obtained from a public cloud. Thus, data processing resources from the public cloud typically are obtained in order to supplement the data processing resources of the consumer's own private cloud at certain times of need. The simultaneous and coordinated operation of data processing resources from multiple clouds may be referred to as hybrid cloud computing. For example, operation of the consumer's private cloud along with resources obtained from one or more public clouds is a specific example of hybrid cloud computing.

In a hybrid cloud environment, it can happen that a user receives resource services from two or more different service providers, wherein all the resource services are integrated toward a common purpose. In the past, this has resulted in certain problems and disadvantages. For example, the metering and reporting of these services is typically performed by the service providers that respectively supply the services. Thus, the metering and reporting information for services of a given provider is furnished to accounts set up with those who access or consume such services. Thus, if a user consumes services from two or more cloud providers, the user will get two or more separate usage reports and bills. This situation and other problems and disadvantages are addressed by embodiments of the invention, as described hereafter in further detail.

SUMMARY

According to an illustrative embodiment, a computer program product is provided in association with a hybrid cloud environment, wherein a user of cloud computing services is disposed to consume cloud provided services delivered by each of a plurality of cloud computing service providers. The computer program product comprises a computer readable storage medium having program instruction embodied therewith that are executable by a computer. Specified event data are received at a metering control service (MCS) component. The event data pertain to metering events related to the cloud provided services delivered by one or more cloud service providers of the plurality. The event data include event data furnished by one or more entities that actively monitor metering events at one or more local or remote cloud service provider locations. Processed aggregated event data are sent from the MCS component to a metering system. The metering system is operated to generate one or more reports from the processed aggregated event data that contains usage information on services provided by one or more cloud service providers of the plurality. The usage information for the given provider specifies a set of amounts and quality of each type of service that has been delivered to one or more users by the given provider.

BRIEF DESCRIPTION OF THE SEVERAL VIEWS OF THE DRAWINGS

FIG. 12 is a block diagram of a data processing system in accordance with an illustrative embodiment;

DETAILED DESCRIPTION

Figure 1:
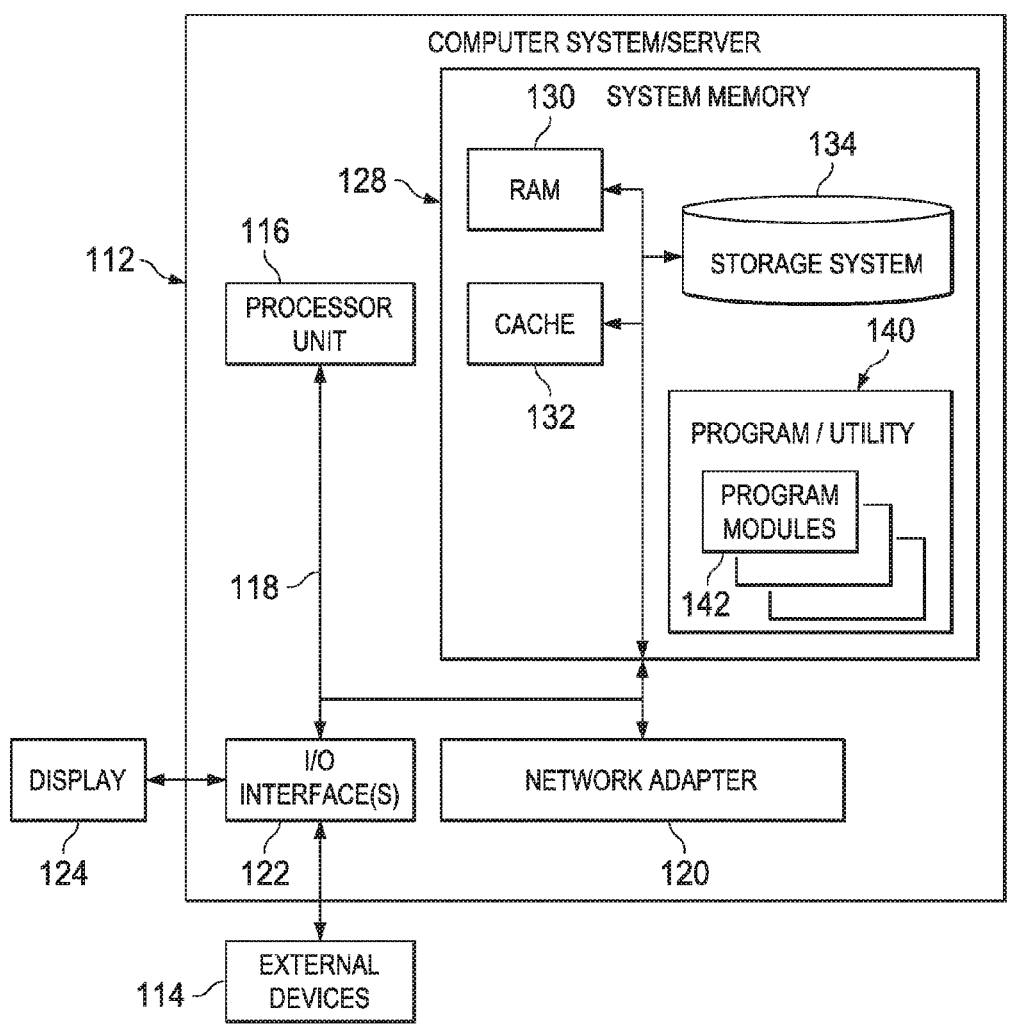
FIG. 1 is a schematic of an example of a cloud computing node in accordance with an illustrative embodiment.

It is understood in advance that although this disclosure includes a detailed description on cloud computing, implementation of the teachings recited herein are not limited to a cloud computing environment. Rather, the illustrative embodiments are capable of being implemented in conjunction with any other type of computing environment now known or later developed.

For convenience, the detailed description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases, automatically to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or consumer-acquired applications created using programming languages and tools supported by the provider. The consumer does not manage or control the underlying cloud infrastructure including networks, servers, operating systems, or storage but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds) and service interoperability.

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is depicted in accordance with an illustrative embodiment. Cloud computing node 110 is only one example of a suitable cloud computing node and is not intended to suggest any limitation as to the scope of use or functionality of the illustrative embodiments described herein. Regardless, cloud computing node 110 is capable of being implemented and/or performing any of the functionality set forth hereinabove.

In cloud computing node 110 there is computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

Computer system/server 112 may be described in the general context of computer system executable instructions, such as program modules being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 110 is shown in the form of a general purpose computing device. The components of computer system/server 112 may include, but are not limited to, one or more processors or processor unit 116, system memory 128, and bus 118 that couples various system components including system memory 128 to processor unit 116.

Processor unit 116 executes instructions for software that may be loaded into system memory 128. Processor unit 116 may be a number of processors, a multi-processor core, or some other type of processor, depending on the particular implementation. A number, as used herein with reference to an item, means one or more items. Further, processor unit 116 may be implemented using a number of heterogeneous processor systems in which a main processor is present with secondary processors on a single chip. As another illustrative example, processor unit 116 may be a symmetric multi-processor system containing multiple processors of the same type.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112 and it includes both volatile media, non-volatile media, removable media, and non-removable media.

System memory 128 can include computer system readable media in the form of volatile memory, such as random access memory (RAM) 130 and/or cache 132. Computer system/server 112 may further include other removable/non-removable and volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, system memory 128 may include at least one program product having a set (e.g., at least one) of program modules that are configured to carry out the functions of embodiments of the illustrative embodiments.

Program/utility 140, having a set (at least one) of program modules 142, may be stored in system memory 128 by way of example and not limitation, as well as an operating system, one or more application programs, other program modules, and program data. Each of the operating systems, one or more application programs, other program modules, and program data or some combination thereof, may include an implementation of a networking environment. Program modules 142 generally carry out the functions and/or methodologies of the illustrative embodiments as described herein.

Computer system/server 112 may also communicate with one or more external devices 114, such as a keyboard, a pointing device, display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks, such as a local area network (LAN), a general wide area network (WAN), and/or a public network (e.g., the Internet) via network adapter 120. As depicted, network adapter 120 communicates with the other components of computer system/server 112 via bus 118. It should be understood that, although not shown, other hardware and/or software components could be used in conjunction with computer system/server 112. Examples include, but are not limited to, microcode, device drivers, redundant processing units, external disk drive arrays, RAID systems, tape drives, and data archival storage systems, etc.

Figure 2:
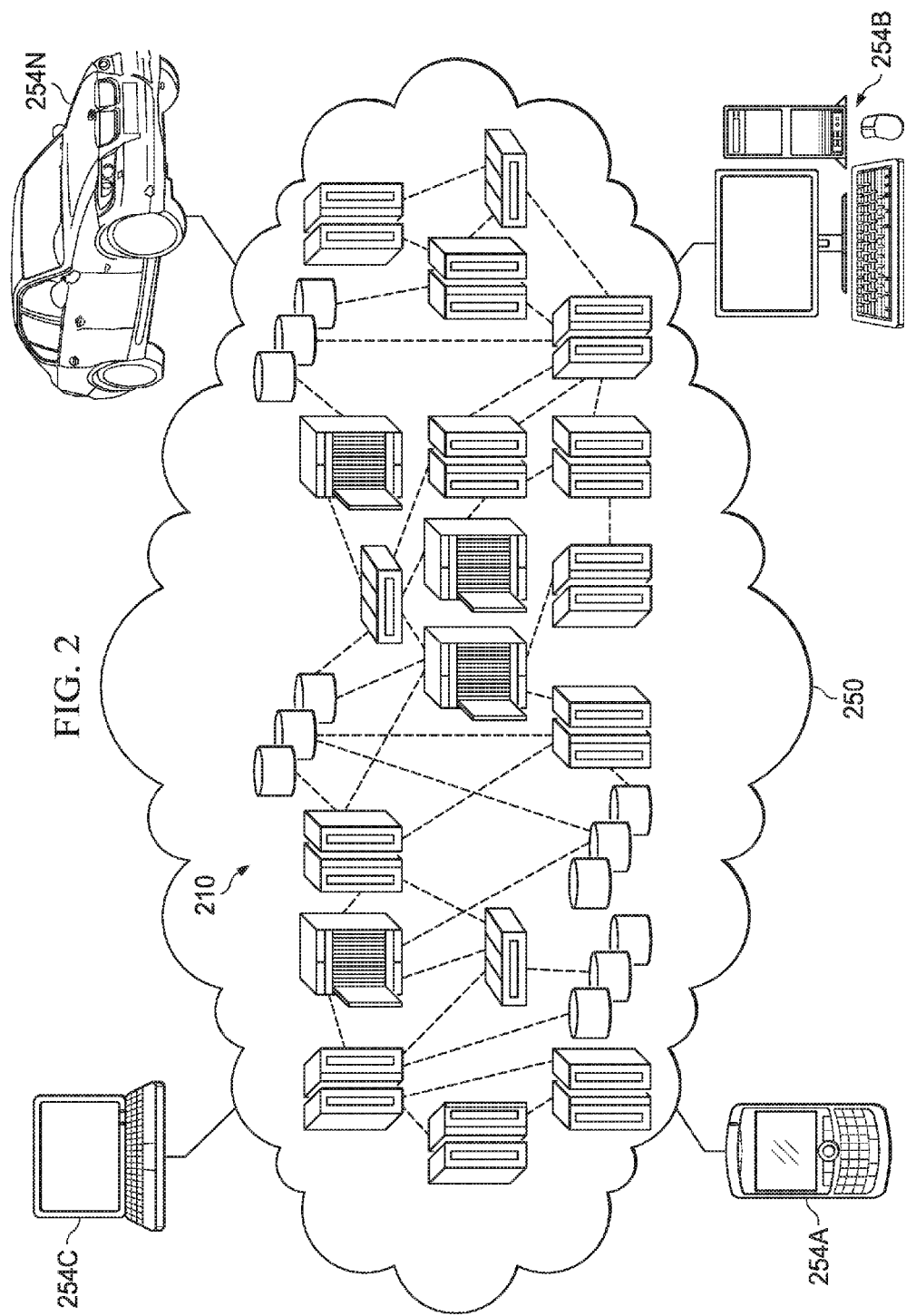
FIG. 2 is an illustration of a cloud computing environment in accordance with an illustrative embodiment.

Referring now to FIG. 2, an illustration of a cloud computing environment is depicted in accordance with an illustrative embodiment. In this illustrative example, cloud computing environment 250 comprises one or more cloud computing nodes 210 with which local computing devices used by cloud consumers may communicate. For example, cloud computing node 110 in FIG. 1 is one example of cloud computing nodes 210. Local computing devices which may communicate with cloud computing nodes 210 may include, for example, personal digital assistant (PDA) or cellular telephone 254A, desktop computer 254B, laptop computer 254C, and/or automobile computer system 254N. Cloud computing nodes 210 may communicate with one another. They may be grouped (not shown) physically or virtually, in one or more networks, such as private, community, public, or hybrid clouds as described hereinabove or a combination thereof. This allows cloud computing environment 250 to offer infrastructure, platforms, and/or software as services for which a cloud consumer does not need to maintain resources on a local computing device. It is understood that the types of computing devices 254A, 254B, 254C, and 254N shown in FIG. 2 are intended to be illustrative only and that cloud computing nodes 210 and cloud computing environment 250 can communicate with any type of computerized device over any type of network and/or network addressable connection (e.g., using a web browser). Program code located on one of cloud computing nodes 210 may be stored on a computer recordable storage medium in one of cloud computing nodes 210 and downloaded to a computing device within computing devices 254A, 254B, 254C, and 254N over a network for use in these computing devices. For example, a server computer in cloud computing nodes 210 may store program code on a computer readable storage medium on the server computer. The server computer may download the program code to a client computer in computing devices 254A, 254B, 254C, and 254N for use on the client computer.

Figure 3:
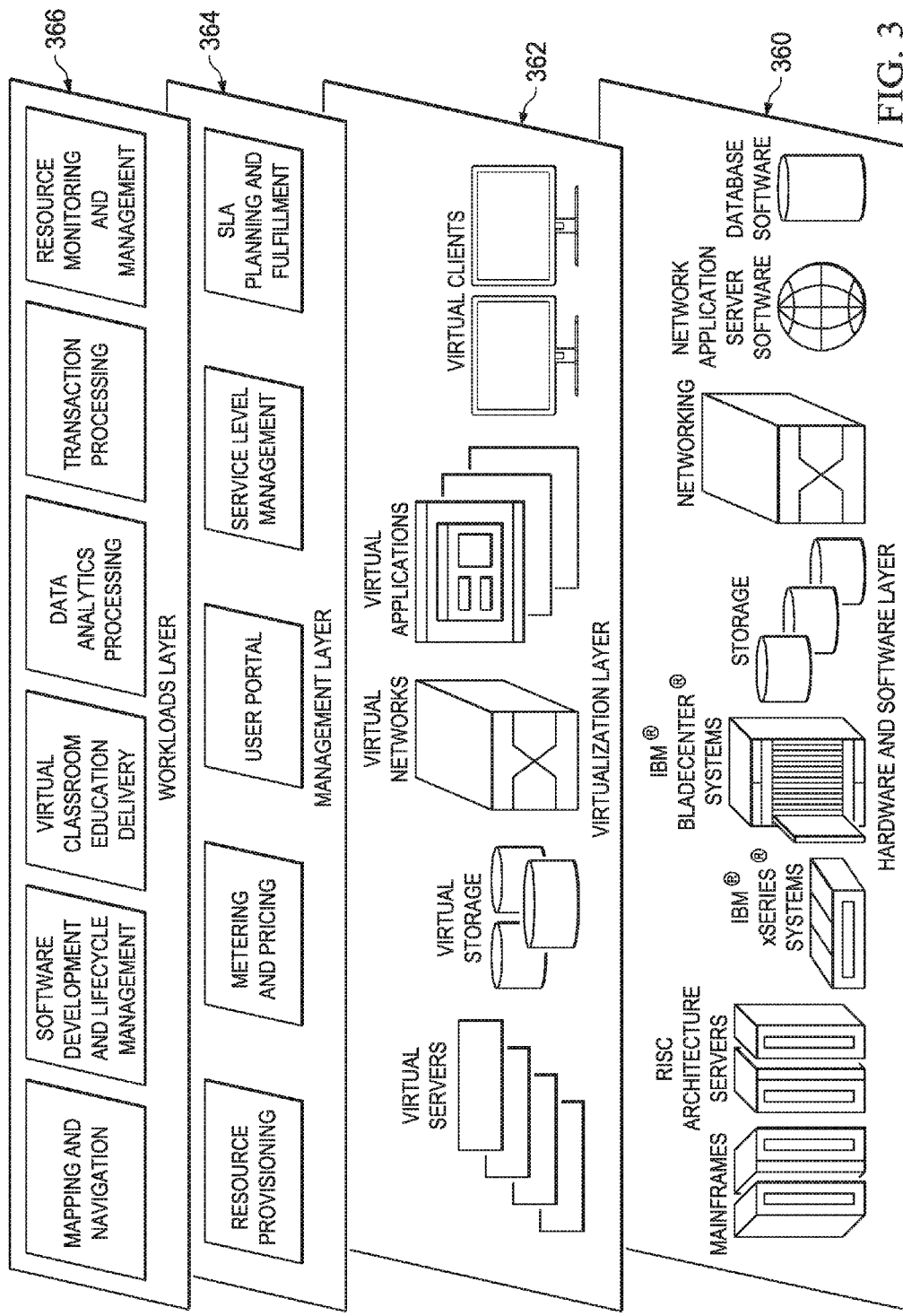
FIG. 3 is a set of functional abstraction layers in accordance with an illustrative embodiment.

Referring now to FIG. 3, a set of functional abstraction layers is depicted in accordance with an illustrative embodiment. The set of functional abstraction layers may be provided by cloud computing environment 250 in FIG. 2. It should be understood in advance that the components, layers, and functions shown in FIG. 3 are intended to be illustrative only and illustrative embodiments are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2® database software. (IBM®, zSeries®, pSeries®, xSeries®, BladeCenter®, WebSphere®, and DB2® are trademarks of International Business Machines Corporation registered in many jurisdictions worldwide)

Virtualization layer 362 provides an abstraction layer from which the following examples of virtual entities may be provided: virtual servers; virtual storage; virtual networks including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and pricing provide usage and cost tracking as resources are utilized within the cloud computing environment and billing or invoicing for consumption of these resources. In one example, these resources may comprise application software licenses. Security provides identity verification for cloud consumers and tasks as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and resource monitoring and management processing.

The different illustrative embodiments recognize and take into account a number of different considerations. For example, the different illustrative embodiments recognize and take into account that many enterprises have an existing investment in information technology resources. These enterprises want to use their existing infrastructure, software, and management resources. Such enterprises, at times, also may want to augment their own data processing resources selectively with cloud based services. Thus, for economic and functional reasons, there may be a need to use on-premise enterprise infrastructure, platform, applications, or data and off-premise cloud service infrastructure, platform, applications, or data in an integrated manner.

The different illustrative embodiments recognize and take into account that in cases of cloud computing, server, network, data, and applications used in processing, the enterprise workload may reside within an enterprise datacenter, may be with partners of the enterprise, or may reside over the Internet in a public cloud. Thus, processing a workload using a combination of on-premise enterprise resources and public cloud resources involves using some of the on-premise infrastructure, platform, applications, or data as well as some off-premise cloud based services and data. Cloud computing solutions of this type may create integration, interoperability, and management problems.

For example, the different illustrative embodiments recognize and take into account that cloud computing consumers desire to maintain a seamless interface across on-premise and off-premise cloud boundaries. However, the governing policies for cloud operation and security related procedures always need to be in place. These competing requirements create the need for an integrated infrastructure and management solution that can span across the consumer datacenter and into one or more public cloud environments.

The different illustrative embodiments recognize and take into account that easy access to public cloud services allows such services to be consumed within an enterprise in a non-centralized and unmanaged manner. De-centralizing and moving data processing resources to off-site vendors increases the complexity and time required to support them. Typically, this complexity is only evident when the cloud resources being consumed are reported to the enterprise information technology department. Security and system governance lapses may result from this lack of management. Regulatory and business compliance may require policy based data sharing across a hybrid cloud. However, current unmanaged methods for accessing cloud service resources cannot guarantee such compliance.

The different illustrative embodiments recognize and take into account that policy based workload management across a hybrid cloud and automated support of cloud computing services will reduce information technology costs. Such hybrid cloud management and support will improve security and compliance and thereby will increase enterprise adoption of cloud technologies.

The different illustrative embodiments recognize and take into account the desirability of a vender neutral and service specific interface to all clouds that provide a desired cloud service. The different illustrative embodiments also recognize and take into account the desirability of controlling cloud vendor selection based on business conditions.

A hybrid cloud integrator, in accordance with an illustrative embodiment, provides for integration of on-premise infrastructure, platform, applications, and data with public cloud based infrastructure, platform, services and data. A hybrid cloud integrator in accordance with an illustrative embodiment may be used to extend on-premise datacenter capabilities by augmenting such capabilities with data processing capabilities provided in a public cloud. For example, such cloud based capabilities may include infrastructure as a service or storage as a service capability. In accordance with an illustrative embodiment, the desired solution for processing a workload may be implemented in a hybrid cloud environment that integrates multiple private cloud and public cloud based services.

A hybrid cloud integrator, in accordance with an illustrative embodiment, may be used to extend the reach of a consumer's on-premise data processing management functionality to manage the data processing resource capabilities extended in a public cloud. In accordance with an illustrative embodiment, a hybrid cloud computing environment including both private cloud and public cloud based services may be managed in a more effective manner as a single logical cloud of resources. Hybrid cloud integration, in accordance with an illustrative embodiment, allows policy based integration of infrastructure, services, and data across the hybrid cloud. In accordance with an illustrative embodiment, management of the integrated infrastructure and services can be performed in a centralized manner. In this way, workload specific actions can be taken consistently and in a vendor neutral manner even if the components of the workload are processed using multiple cloud based services.

A hybrid cloud integrator, in accordance with an illustrative embodiment, may comprise a hybrid cloud integration framework. Hybrid cloud integration components may be plugged in to the hybrid cloud integration framework as needed in a systematic manner.

The different illustrative embodiments recognize and take into account that current cloud based services accessible over the internet are provided by multiple vendors. Multiple vendors offer directly competing services. For example, both IBM SBDTC and Amazon EC2 offer infrastructure as a service cloud services.

The different illustrative embodiments recognize and take into account that at present, there is no centralized metering and accounting of cloud based services, even when a user receives services from multiple providers, and the services are all integrated for a common purpose. As a result, if a user obtains services from two different cloud providers, the user will get two separate usage reports and bills. Thus, individual users must currently manage multiple cloud accounts. In an enterprise environment, in addition to increased overhead, the above situation creates significant challenges for enterprise CTOs and others.

In accordance with illustrative embodiments of the invention, a centralized, on-premise metering and accounting tool is enabled to meter and aggregate the services supplied by each one of multiple cloud providers in a hybrid cloud. The metering data is then used for generating unified usage reports and for chargeback. The availability of such data also makes it much easier for an enterprise user to keep track of cloud based services consumed by employees in different departments or lines of business. Moreover, embodiments of the invention can be readily employed to leverage volume based usage of external services, and to create metering, accounting and chargeback of composite and value added services built on top of core infrastructure and platform services. Embodiments of the invention can additionally be used to enhance the tracking of changes and emerging trends in the IT requirements across different user groups, departments and business organizations.

Figure 4:
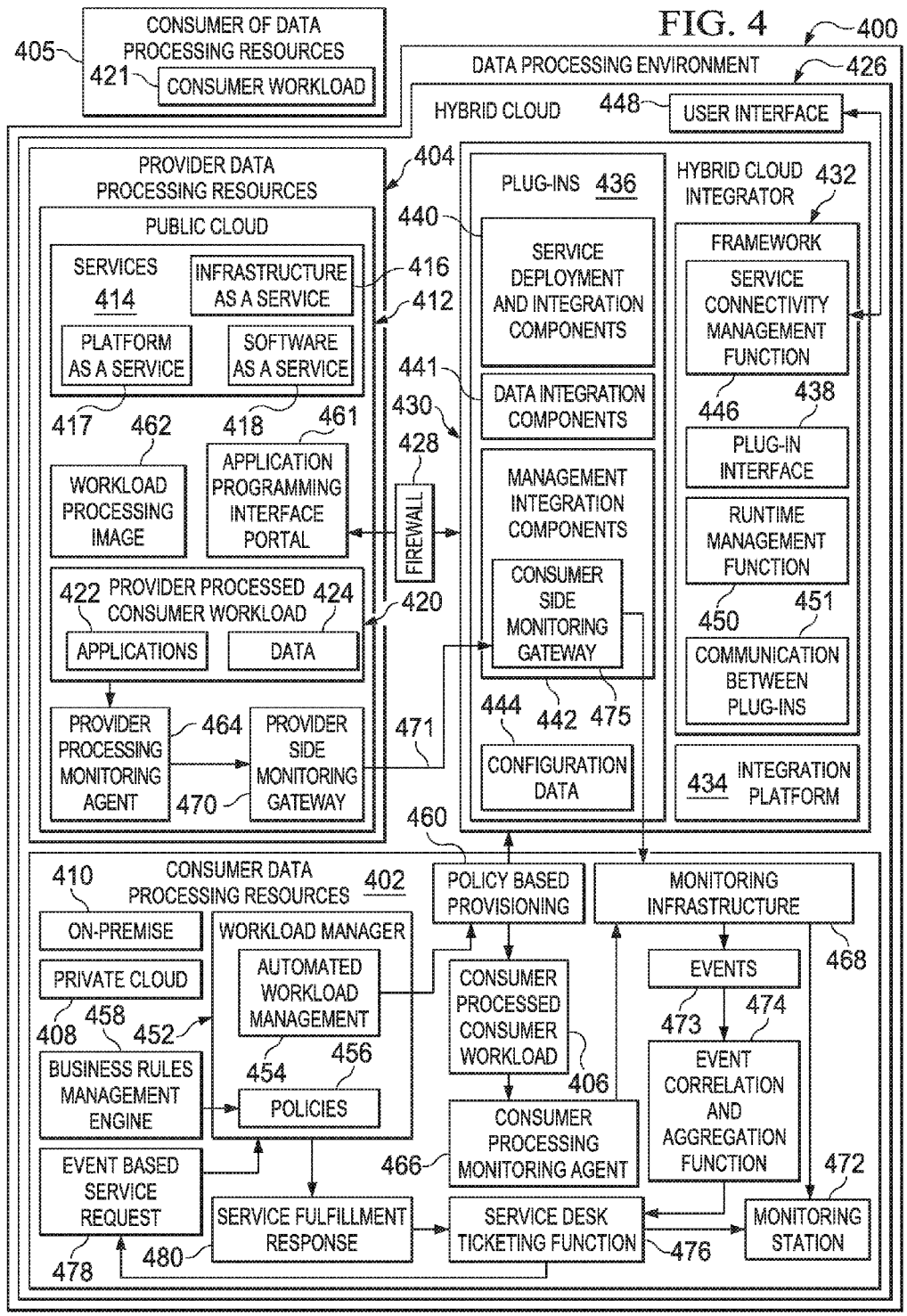
FIG. 4 is a block diagram of a data processing environment employing hybrid cloud integration in accordance with an illustrative embodiment.

Referring now to FIG. 4, a block diagram of a data processing environment employing hybrid cloud integration is depicted in accordance with an illustrative embodiment. Data processing environment 400 includes consumer data processing resources 402 and provider data processing resources 404. In some embodiments, provider data processing resources 404 may be referred to as first data processing resources, and consumer data processing resources 402 may be referred to as second data processing resources or vice versa.

Consumer data processing resources 402 may include data processing resources that are owned or controlled exclusively by consumer of data processing resources 405. For example, consumer of data processing resources 405 may be a business entity or other organization or enterprise that uses consumer data processing resources 402 to process consumer processed consumer workload 406.

Consumer data processing resources 402 may include any combination of data processing systems and devices for processing consumer processed consumer workload 406. For example, consumer data processing resources 402 may include any combination of data processing infrastructure, networks, processors, data storage, databases, and applications.

Consumer data processing resources 402 may include or may be referred to as private cloud 408. Consumer data processing resources 402 may include data processing resources that are located on-premise 410 or may be referred to as being on-premise 410. In this case, on-premise 410 may mean that all of consumer data processing resources 402 are co-located in a single location that is owned or controlled by consumer of data processing resources 405 that also owns or controls consumer data processing resources 402. Alternatively, on-premise 410 may mean that consumer data processing resources 402 are under the control of consumer of data processing resources 405 for exclusive use by consumer of data processing resources 405, even though some or all of consumer data processing resources 402 are physically located in a number of remote locations.

Provider data processing resources 404 are data processing resources that are available to be shared by a number of consumers of data processing resources, including consumer of data processing resources 405. Provider data processing resources 404 may include any combination of data processing systems or devices. For example, provider data processing resources 404 may include any combination of data processing infrastructure, networks, processors, data storage, or applications.

Provider data processing resources 404 may be provided as services 414. For example, provider data processing resources 404 may be provided as services 414 by public cloud 412. Public cloud 412 makes provider data processing resources 404 available to consumer of data processing resources 405 as services 414. For example, services 414 may include one or more of infrastructure as a service 416, platform as a service 417, software as a service 418, or other data processing related services.

At certain times, consumer of data processing resources 405 may use provider data processing resources 404 to process provider processed consumer workload 420. Provider processed consumer workload 420 typically is a portion of the entire consumer workload 421 that consumer of data processing resources 405 needs to be processed. In some cases, provider processed consumer workload 420 may be the entire consumer workload 421 that consumer of data processing resources 405 needs to be processed. For example, consumer of data processing resources 405 may use provider data processing resources 404 to process provider processed consumer workload 420 when consumer data processing resources 402 are overloaded processing consumer processed consumer workload 406. At other times, consumer of data processing resources 405 may employ provider data processing resources 404 to process provider processed consumer workload 420 when processing of provider processed consumer workload 420 is not one of the core competencies of consumer of data processing resources 405. As another example, consumer of data processing resources 405 may use provider data processing resources 404 to process provider processed consumer workload 420 when particular applications required to process provider processed consumer workload 420 are not available among consumer data processing resources 402. In any case, processing of provider processed consumer workload 420 using provider data processing resources 404 may require that a number of applications 422 or data 424, or both applications 422 and data 424, be provided to provider data processing resources 404 in order to process provider processed consumer workload 420.

Thus, at times, the entire consumer workload 421 being processed by or for consumer of data processing resources 405 may be processed in part as consumer processed consumer workload 406 on consumer data processing resources 402, such as private cloud 408, and in part as provider processed consumer workload 420 on provider data processing resources 404, such as public cloud 412. In this case, the integration of private cloud 408 and public cloud 412 to process consumer workload 421 for consumer of data processing resources 405 forms hybrid cloud 426.

Operation of hybrid cloud 426 requires communication between consumer data processing resources 402 and provider data processing resources 404. However, security concerns may require the prevention of unauthorized access to consumer data processing resources 402 from provider data processing resources 404 or from any other unauthorized sources. Therefore, firewall 428 may be provided between consumer data processing resources 402 and provider data processing resources 404. Firewall 428 is designed to block unauthorized access to consumer data processing resources 402 by provider data processing resources 404 or by any other resources on the internet while permitting authorized communications between consumer data processing resources 402 and provider data processing resources 404. Firewall 428 may be implemented in either hardware or software or using a combination of both hardware and software. For example, without limitation, firewall 428 may be implemented in consumer data processing resources 402.

In accordance with an illustrative embodiment, hybrid cloud integrator 430 provides integration across consumer data processing resources 402 and provider data processing resources 404 to implement integrated data processing resources forming hybrid cloud 426. For example, without limitation, hybrid cloud integrator 430 may be implemented by consumer of data processing resources 405 on consumer data processing resources 402.

In accordance with an illustrative embodiment, hybrid cloud integrator 430 includes framework 432, integration platform 434, and number of plug-ins 436. For example, framework 432 may be implemented in software as a software framework. Framework 432 may be implemented on integration platform 434. Integration platform 434 provides the underlying hardware and software required to implement hybrid cloud integrator 430. For example, integration platform 434 may include the hardware, operating system, and runtime environment in which hybrid cloud integrator 430 is implemented.

Framework 432 provides plug-in interface 438. Plug-in interface 438 allows number of plug-ins 436 to be installed in hybrid cloud integrator 430. Plug-ins 436 are software components that are configured to provide functionality for integrated use of consumer data processing resources 402 and provider data processing resources 404. Plug-ins 436 may include, for example, number of service deployment and integration components 440, number of data integration components 441, and number of management integration components 442.

In accordance with an illustrative embodiment, service deployment and integration components 440 may be used by consumer of data processing resources 405 to deploy services 414 in provider data processing resources 404 that are needed to process provider processed consumer workload 420. Service deployment and integration components 440 also may be used to integrate services 414 deployed in provider data processing resources 404 with consumer data processing resources 402 to provide integrated data processing resources to process consumer workload 421.

Data integration components 441 may be used by consumer of data processing resources 405 to migrate, replicate, transform, and integrate data used in processing consumer workload 421 between consumer data processing resources 402 and provider data processing resources 404. Service deployment and integration components 440 and data integration components 441 may be used to enforce workload and data specific deployment and integration policies specified by consumer of data processing resources 405.

Management integration components 442 may include any components that may be used by consumer of data processing resources 405 to monitor and manage the processing of provider processed consumer workload 420 by provider data processing resources 404. For example, management integration components 442 may include monitoring integration components. Monitoring integration components may be used by consumer of data processing resources 405 to monitor the processing of provider processed consumer workload 420 by provider data processing resources 404 in order to manage such processing. Management integration components 442 may also, or alternatively, include metering components or secure connectivity management components or other management related components.

The operating characteristics of plug-ins 436 are defined by configuration data 444. In accordance with an illustrative embodiment, framework 432 provides service connectivity management function 446. Service connectivity management function 446 allows current configuration data 444 from plug-ins 436, and other information about plug-ins 436, to be made available to a user on user interface 448. Service connectivity management function 446 also allows configuration data 444 to be received from user interface 448 for plug-ins 436. Thus, service connectivity management function 446 provides a connection between plug-ins 436 and user interface 448 allowing users to view and change the operating configuration of plug-ins 436 via user interface 448.

Framework 432 also provides runtime management function 450. Runtime management function 450 provides for managing operation of plug-ins 436 during operation thereof. Specifically, runtime management function 450 may provide for activating plug-ins 436 and for controlling operation of plug-ins 436 after plug-ins 436 are activated.

Framework 432 also may provide for communication between plug-ins 451. Communication between plug-ins 451 allows plug-ins 436 to interact with each other. For example, communication between plug-ins 451 allows one of plug-ins 436 to access and make use of the functionality provided by another of plug-ins 436 in framework 432.

In accordance with an illustrative embodiment, hybrid cloud integrator 430 provides flexible and reliable automated integration of data processing resources to process a workload. For example, hybrid cloud integrator 430 may be used by workload manager 452 to access provider data processing resources 404 automatically when needed to supplement consumer data processing resources 402. Hybrid cloud integrator 430 also may be used by workload manager 452 to monitor the operation of provider data processing resources 404 while processing provider processed consumer workload 420.

Workload manager 452 provides automated workload management 454. Automated workload management 454 includes automatically managing workload processing on available data processing resources. An example of a system that provides this type of automated workload management is the IBM® Tivoli® Service Automation Manager, TSAM, available from International Business Machines Corporation. Illustrative embodiments may be used, however, in combination with any currently available workload manager providing automated workload management functions or with any workload manager that may become available in the future. Illustrative embodiment also may be used in combination with workload managers in which automated workload management functions are implemented in combination with a human operator.

Workload manager 452 may provide automated workload management 454 based on policies 456. Policies 456 define the limiting parameters under which workload manager 452 may use available data processing resources. For example, policies 456 may define when or under what conditions workload manager 452 may use provider data processing resources 404 to process consumer workload 421. Policies 456 also may specify which specific provider data processing resources 404 may be used to process consumer workload 421. Policies 456 also may specify consumer data that may be replicated and accessed by provider data processing resources 404 and the portion of consumer workload 421 that may be processed by provider data processing resources 404. Policies 456 may specify security and privacy constraints that must be applied for processing consumer workload 421 by provider data processing resources 404.

Policies 456 may be developed using business rules management engine 458. Business rules management engine 458 may take into consideration a variety of business related and other factors to determine policies 456. For example, factors used by business rules management engine 458 to determine policies 456 may include financial, security, compliance, and customer relations factors, or others.

Workload manager 452 may provide automatic policy based provisioning 460 based on policies 456. For example, policy based provisioning 460 may call for the provisioning of provider data processing resources 404 to process provider processed consumer workload 420. In this case, workload manager 452 may use hybrid cloud integrator 430 to deploy provider data processing resources 404 needed to process provider processed consumer workload 420. For example, service deployment and integration components 440 may be used to deploy services 414 in public cloud 412 that are needed to process provider processed consumer workload 420. Service deployment and integration components 440 may establish communication with provider data processing resources 404 through firewall 428. For example, such communication may be established via application programming interface portal 461 in public cloud 412. Applications 422, data 424, or both applications 422 and data 424 needed for processing provider processed consumer workload 420, may be provided to provider data processing resources 404 by workload manager 452 via hybrid cloud integrator 430.

Hybrid cloud integrator 430 also may be used to establish workload processing image 462 in public cloud 412. Workload processing image 462 pre-defines services 414 needed to process provider processed consumer workload 420. By establishing workload processing image 462 in advance, provider data processing resources 404 needed to process provider processed consumer workload 420 may be deployed more rapidly when workload manager 452 determines that provider data processing resources 404 will be used for this purpose.

In accordance with an illustrative embodiment, hybrid cloud integrator 430 allows workload manager 452 to access provider data processing resources 404 as easily as consumer data processing resources 402. Plug-ins 436 in hybrid cloud integrator 430 handle all of the special requirements of provider data processing resources 404 needed to access those resources.

In accordance with an illustrative embodiment, hybrid cloud integrator 430 also provides for monitoring and management of the processing of provider processed consumer workload 420 by provider data processing resources 404. For example, service deployment and integration components 440 may be used to deploy services 414 in public cloud 412 to implement provider processing monitoring agent 464. Provider processing monitoring agent 464 collects data for monitoring the processing of provider processed consumer workload 420 by provider data processing resources 404. Similarly, consumer processing monitoring agent 466 may be implemented in consumer data processing resources 402. Consumer processing monitoring agent 466 collects data for monitoring the processing of consumer processed consumer workload 406 by consumer data processing resources 402.

Data from consumer processing monitoring agent 466 may be provided to monitoring infrastructure 468. Monitoring infrastructure 468 may be implemented in consumer data processing resources 402. Due to the security provided by firewall 428, provider processing monitoring agent 464 may not be allowed to push data to monitoring infrastructure 468 on the other side of firewall 428. In accordance with an illustrative embodiment, during runtime, monitoring components that are part of management integration components 442 installed in hybrid cloud integrator 430 may activate provider side monitoring gateway 470 in provider data processing resources 404. Provider side monitoring gateway 470 may be deployed in provider data processing resources 404 using service deployment and integration components 440 installed in hybrid cloud integrator 430. Data from provider processing monitoring agent 464 is provided to provider side monitoring gateway 470. Monitoring components in hybrid cloud integrator 430 may retrieve the monitored data from provider side monitoring gateway 470 via connection 471. The monitoring components in hybrid cloud integrator 430 then may provide the monitored data from the provider side of hybrid cloud 426 to monitoring infrastructure 468. From the point of view of monitoring infrastructure 468, the monitoring components in hybrid cloud integrator 430 provide monitored data for provider side services 414 in the same manner as consumer processing monitoring agent 466 provides monitored data for consumer data processing resources 402.

Connection 471 may be implemented using a hybrid cloud monitoring plug-in in hybrid cloud integrator 430. For example, the hybrid cloud monitoring plug-in may be one of management integration components 442 in hybrid cloud integrator 430. The monitoring plug-in may enable hybrid cloud monitoring by setting up and configuring provider side monitoring gateway 470 and consumer side monitoring gateway 475. For example, consumer side monitoring gateway 475 may be implemented in hybrid cloud integrator 430 on the consumer side of hybrid cloud 426. Consumer side monitoring gateway 475 connects to provider side monitoring gateway 470, negotiating firewall 428. Consumer side monitoring gateway 475 also connects with monitoring infrastructure 468 in consumer data processing resources 402. Using connection 471 to provider side monitoring gateway 470, consumer side monitoring gateway 475 may pull monitored data for provider data processing resources 404 that is collected by provider side monitoring gateway 470 across firewall 428 and then push the data to consumer side monitoring infrastructure 468.

In one embodiment, as just described, connection 471 is implemented via hybrid cloud integrator 430 to provide access through firewall 428 to information for monitoring the processing of provider processed consumer workload 420 in public cloud 412 by monitoring infrastructure 468. In other embodiments, connection 471 may be implemented separately from hybrid cloud integrator 430. For example, using a virtual private network, a secure connection may be established between monitoring infrastructure 468 and provider data processing resources 404 processing provider processed consumer workload 420 in public cloud 412 to implement a connection through firewall 428 without using the resources of hybrid cloud integrator 430.

Monitoring infrastructure 468 thus may receive monitoring information for provider data processing resources 404 that is obtained by provider processing monitoring agent 464 and monitoring information from consumer processing monitoring agent 466 for consumer data processing resources 402. Monitoring infrastructure 468 may process the received monitoring information to generate an integrated display of workload processing conditions for provider data processing resources 404 and consumer data processing resources 402. This integrated display may be presented to a user, such as a system administrator on monitoring station 472. Thus, in accordance with an illustrative embodiment, a display of workload processing conditions across hybrid cloud 426 may be presented to a user in an integrated manner. Such an integrated display allows a user to monitor and manage workload processing across hybrid cloud 426 in an integrated, effective, and efficient manner.

Monitoring infrastructure 468 also may look for and detect the occurrence of events 473 from the monitoring information provided by provider processing monitoring agent 464 and consumer processing monitoring agent 466. Events 473 may be defined by the occurrence of specified conditions or patterns in the monitored data. For example, monitored data exceeding a defined threshold for at least a specified time period may indicate the occurrence of one of events 473. In accordance with an illustrative embodiment, events 473 may be defined by the occurrence of any condition, state, or pattern of interest in the monitored data provided by provider processing monitoring agent 464 and consumer processing monitoring agent 466.

Events 473 may be provided as input to event correlation and aggregation function 474. Event correlation and aggregation function 474 may provide, and may be referred to as, an event correlation service. Event correlation and aggregation function 474 may aggregate and correlate events 473 over periods of time. Event correlation and aggregation function 474 may determine whether the aggregated and correlated events 473 indicate the presence of data processing conditions that should be or may be addressed to maintain or improve system performance. For example, event correlation and aggregation function 474 may determine that a series of detected events 473 has occurred indicating that consumer data processing resources 402 or provider data processing resources 404 are overloaded. Similarly, event correlation and aggregation function 474 may determine that a series of detected events 473 has occurred indicating that consumer data processing resources 402 or provider data processing resources 404 are being underutilized. In accordance with an illustrative embodiment, any data processing condition of interest that may be defined by aggregated or correlated events 473 may be detected by event correlation and aggregation function 474.

In response to a determination by event correlation and aggregation function 474 that a data processing condition of interest exists, service desk ticketing function 476 may send event based service request 478 to workload manager 452. For example, service desk ticketing function 476 may generate event based service request 478 in response to a determination by event correlation and aggregation function 474 that a data processing condition exists that should be or may be addressed to maintain or improve system performance. Event based service request 478 may indicate to workload manager 452 the particular condition that has been determined to exist. In this case, workload manager 452 may determine the appropriate action to take in response to the indicated condition. Alternatively, service desk ticketing function 476 may determine the action that needs to be taken in response to a particular condition that has been determined to exist. In this case, event based service request 478 may indicate to workload manager 452 the action that is being requested.

In any case, workload manager 452 may determine whether or not any action may be taken in response to a particular data processing condition based on policies 456. If workload manager 452 determines that action will be taken in response to a particular data processing condition, workload manager 452 may implement such action based on policies 456. For example, workload manager 452 may respond to event based service request 478 by implementing appropriate policy based provisioning 460 of data processing resources as needed to respond to a detected data processing condition.

Workload manager 452 also may respond to event based service request 478 by generating service fulfillment response 480. For example, service fulfillment response 480 may be generated by workload manager 452 and delivered to service desk ticketing function 476. Service fulfillment response 480 may indicate that event based service request 478 has been received by workload manager 452. Service fulfillment response 480 also may indicate that appropriate action has been taken, or will be taken, in response to event based service request 478. In this case, service fulfillment response 480 may or may not specify the particular action taken, or to be taken, by workload manager 452 in response to event based service request 478. In some cases, workload manager 452 may not be able to take action to change data processing conditions in response to event based service request 478. For example, policies 456 may prevent workload manager 452 from taking action in response to event based service request 478 at a particular time. In this case, service fulfillment response 480 may indicate that action will not be taken by workload manager 452 in response to event based service request 478 or that the implementation of such action may be delayed. Policies 456, responsible for such a failure to act or for such a delay, may or may not be identified in service fulfillment response 480.

The information provided by event based service request 478 and service fulfillment response 480 may be formatted appropriately and displayed for a user on monitoring station 472. By displaying information from event based service request 478 and service fulfillment response 480 in this manner, a user is able to monitor the detection of data processing system conditions for which an appropriate action may be taken and the response of workload manager 452 to the detection of such conditions.

In accordance with an illustrative embodiment, hybrid cloud integrator 430 makes it possible for workload manager 452 to respond to determined data processing conditions of interest in consumer data processing resources 402, in provider data processing resources 404, or both. Furthermore, hybrid cloud integrator 430 makes it possible for workload manager 452 to access consumer data processing resources 402, provider data processing resources 404, or both, for responding to determined conditions of interest. Thus, hybrid cloud integrator 430 makes it possible for workload manager 452 to provide integrated data processing resource management across hybrid cloud 426 by providing for monitoring of data processing conditions across hybrid cloud 426 and by providing access to data processing resources across hybrid cloud 426 when responding to such conditions.

For example, as discussed above, hybrid cloud integrator 430 may be used to establish monitoring of the processing of portions of consumer workload 421 by provider data processing resources 404 while processing of other portions of consumer workload 421 by consumer data processing resources 402 also is monitored at the same time. Based on such monitoring, an overload condition or underutilization condition on consumer data processing resources 402, on provider data processing resources 404, or both, may be determined. In response to such a determination, workload manager 452 may activate or deactivate selected consumer data processing resources 402, may deploy or release selected provider data processing resources 404 using hybrid cloud integrator 430 in the manner described above, or both. Processing of portions of consumer workload 421 then may be allocated by workload manager 452 across the reconfigured resources of hybrid cloud 426 to remedy the determined overload or underutilization condition. The particular action taken by workload manager 452 in response to the determined condition may be determined by policies 456.

The illustration of FIG. 4 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, hybrid cloud 426 may include more than public cloud 412 in combination with private cloud 408. Hybrid cloud 426 may include multiple private clouds, community clouds, or public clouds in any combination. In accordance with an illustrative embodiment, hybrid cloud integrator 430 may be used to provide integration of data processing resources across multiple private, public, and community clouds in any combination.

Furthermore, hybrid cloud integrator 430, in accordance with an illustrative embodiment, may be used to provide integrated monitoring and management across hybrid cloud 426 that is related to data processing conditions other than data processing resource overload and underutilization conditions. For example, hybrid cloud integrator 430, in accordance with an illustrative embodiment, may be used to provide integrated management across hybrid cloud 426 of monitoring, metering, security, or any other data processing related conditions.

Integrated monitoring and management of hybrid cloud 426 using hybrid cloud integrator 430, in accordance with an illustrative embodiment, may be implemented automatically using an automated management system, such as workload manger 452. Alternatively, monitoring and management using hybrid cloud integrator 430, in accordance with an illustrative embodiment, may be provided by a human system manager using appropriate system interfaces, such as user interface 448 or monitoring station 472 in combination with other appropriate system interfaces. Monitoring and management using hybrid cloud integrator 430, in accordance with an illustrative embodiment, may be provided by an automated management system and a human system manager operating together.

Figure 5:
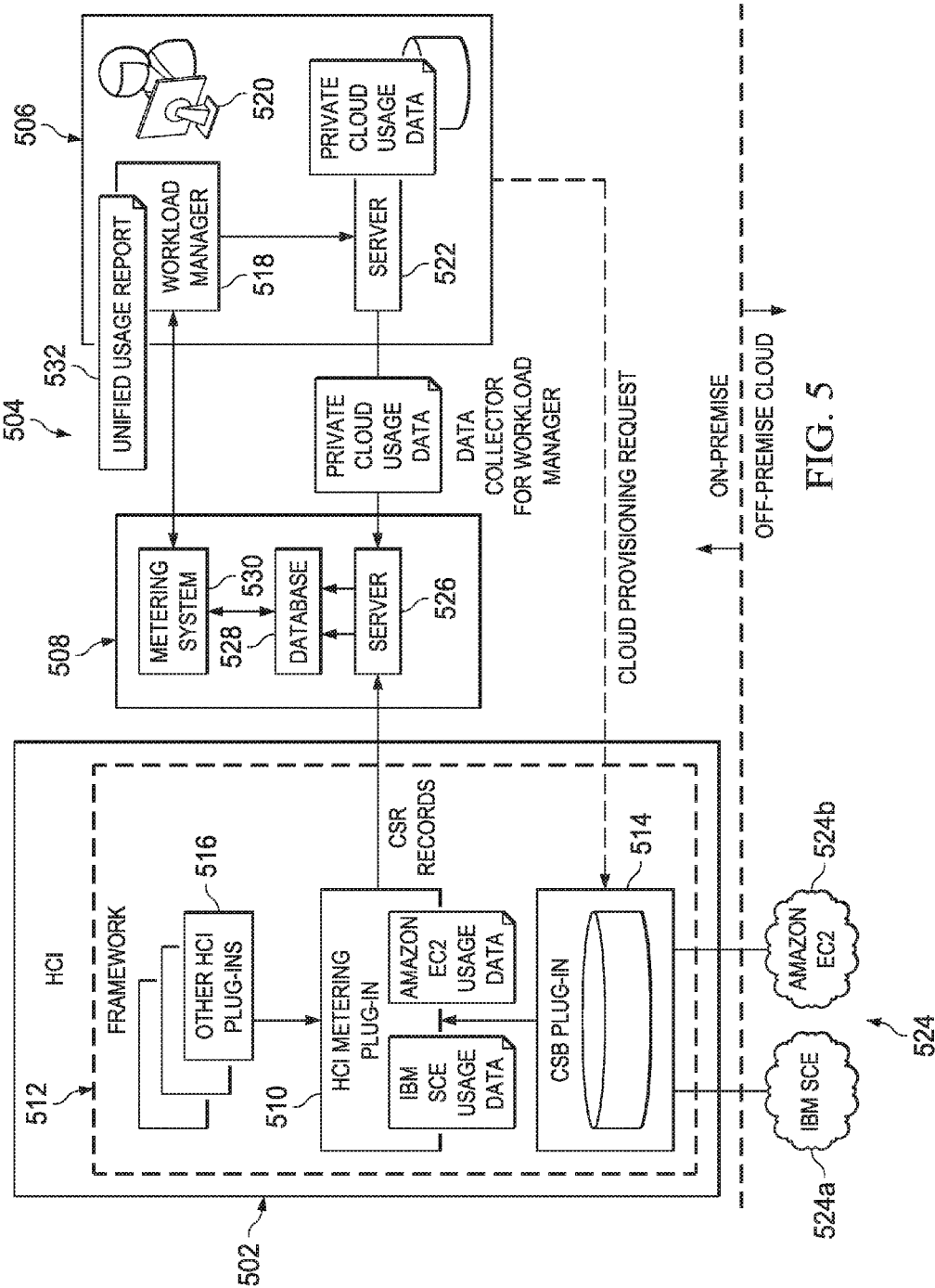
FIG. 5 is a simplified schematic diagram which shows components of an illustrative embodiment of the invention.

Referring to FIG. 5, there is shown a simplified schematic diagram depicting respective components for an illustrative embodiment of the invention. FIG. 5 in particular shows a hybrid cloud integrator (HCI) 502 which is located proximate to on-premise components of a data center 504 of a user or consumer of cloud computing services. These components include a workload management component 506, and a usage and accounting component 508. Such components may, for example, be consumer data processing resources 402 as described above in connection with FIG. 4.

Hybrid cloud integrator 502 is usefully similar to hybrid cloud integrator 430, described above in connection with FIG. 4, in that hybrid cloud integrator 502 provides for integration of on-premise infrastructure, platform, applications, and data with public cloud based infrastructure, platform, services and data. Moreover, it is to be emphasized that embodiments of the invention apply to integration between on-premise traditional IT and a private or public cloud; between private-private clouds; between private-public clouds; and between public-public clouds. Hybrid cloud integrator 502 also comprises a framework 512, which is implemented on an integration platform and is similar or identical to framework 432. Thus, hybrid cloud integrator 502 can receive and support plug-ins in a systematic manner. In addition, however, hybrid cloud integrator 502 is provided with a metering control services (MCS) plug-in, or metering plug-in 510. Metering plug-in 510 is configured to receive or acquire cloud usage events data from a cloud service broker (CSB) plug-in 514, which is also deployed in hybrid cloud integrator 502. Cloud service broker plug-in 514 is a type of service deployment and integration component 440 shown in FIG. 4 that may be used to provision and deploy services in one or more cloud service provider environments. The hybrid cloud integrator 502 further includes one or more other plug-ins, collectively referenced as plug-ins 516, which may similarly provide data to metering plug-in 510. Metering plug-in 510 may also receive metering events from sources external to the hybrid cloud integrator 502 such as the cloud service provider or another entity monitoring service behavior and usage.

Referring further to FIG. 5, there is shown a user or user 520 for management component 506. Management component 506 comprises a work load manager 518 and a server 522, such as a SUSE Linux Enterprise Server (SLES) that is capable of processing partially or fully the user workload. In an exemplary embodiment, workload manager 518 is similar or identical to workload manager 452, described above in connection with FIG. 4, and therefore usefully comprises a TSAM. Accordingly, workload manager 518 is capable of automatically managing workload processing on available data processing resources. Such resources can comprise both on-premise and off-premise resources. Thus, workload manager 518 may use services provided by off-premise public and private cloud service providers 524 to process a user workload on the provider's computing resources, as exemplified in FIG. 5 by cloud computing providers IBM SmartCloud Enterprise (IBM SCE) 524a and Amazon Elastic Compute Cloud (Amazon EC2) 524b.

To place a service request using workload manager 518, a user may make use of a catalog or service log to determine the services that are available. After selecting a service and submitting it with any additional information, workload manager 518 orchestrates the request and decides whether to use an on-premise or off-premise service. Usage data for services in the private cloud, such as on-premise virtual machine (VM) data, is monitored by workload manager 518. FIG. 5 shows events related to private cloud usage data routed to usage and accounting component 508.

In order to obtain events related to cloud provided services from one or more off-premise service providers such as public cloud providers 524a and 524b, and also to subsequently change or end such services, workload manager 518 sends requests for corresponding cloud provided services to the cloud service broker plug-in 514 at hybrid cloud integrator 502. The cloud service broker plug-in 514 then routes respective requests to the appropriate cloud service provider and manager, such as service provider 524a or 524b. As described hereinafter in further detail, a provisioning request for a particular instance of provisioning, by a particular provider, will result in a series of events which pertain to the instance. Such events may include create, start, stop and delete events, by way of example. These events sequentially affect the provisioning instance, and also furnish a precise measure of the usage which has been made of the resource provisioning service of the particular service provider. Accordingly, such events are referred to herein as usage metering related events, or metering events.

In view of the above, FIG. 5 shows metering plug-in 510 receiving usage data from cloud service broker plug-in 514. The usage data comprises data generated by successive metering events of the above type, which pertain to provisioning instances of cloud service providers such as providers 524a and 524b. One of the functions of cloud service broker plug-in 514 is to be a provider of metering events as it brokers cloud services that produce these events, by example but without limitation: provisioning, de-provisioning, or actions that cause resources to change state. Metering plug-in 510 is configured to receive metering events, as they are processed by cloud service broker plug-in 514. Moreover, metering plug-in 510 is integrated with other plug-ins 516 of hybrid cloud integrator 502, to also receive metering events therefrom. Thus, as provisioning and change requests for cloud based services are processed in one of the plug-ins of hybrid cloud integrator 502, metering event data pertaining to the respective requests is received by metering plug-in 510. Such data is then selectively aggregated, and processed to form records of service usage delivered by respective providers, as described hereafter in further detail.

At specified times or upon specific events, these records are routed from metering plug-in 510 to accounting and usage component 508. FIG. 5 more particularly shows the aggregated events data being sent to server 526 of component 508 in the form of CSR (Common Source Resource) records, by way of example. Component 508 further includes a database 528 and a metering system 530, which is a metering and chargeback engine. The metering system usefully processes the records of usage, together with accounting, billing and other related metering events, in order to generate usage and chargeback reports. Such usage and account information may then be made available to workload manager 518.

In a useful embodiment of the invention, metering system 530 comprises the IBM® Tivoli® Usage & Accounting Manager (TUAM), available from International Business Machines Corporation. Server 526 usefully comprises a SUSE Linux Enterprise Server (SLES).

In a further useful embodiment, the records of usage provided by metering plug-in 510 and hybrid cloud integrator can be combined by metering system 530 with other like usage data, for example, the private cloud usage data shown produced by user 520. Metering system 530 can then provide workload manager 518 with a unified usage report 532, which shows the collective usage of the provisioning resource services supplied by multiple service providers. It is anticipated that information included in report 532 can have widespread use and be of significant benefit to the organization associated with data center 504.

Figure 6:
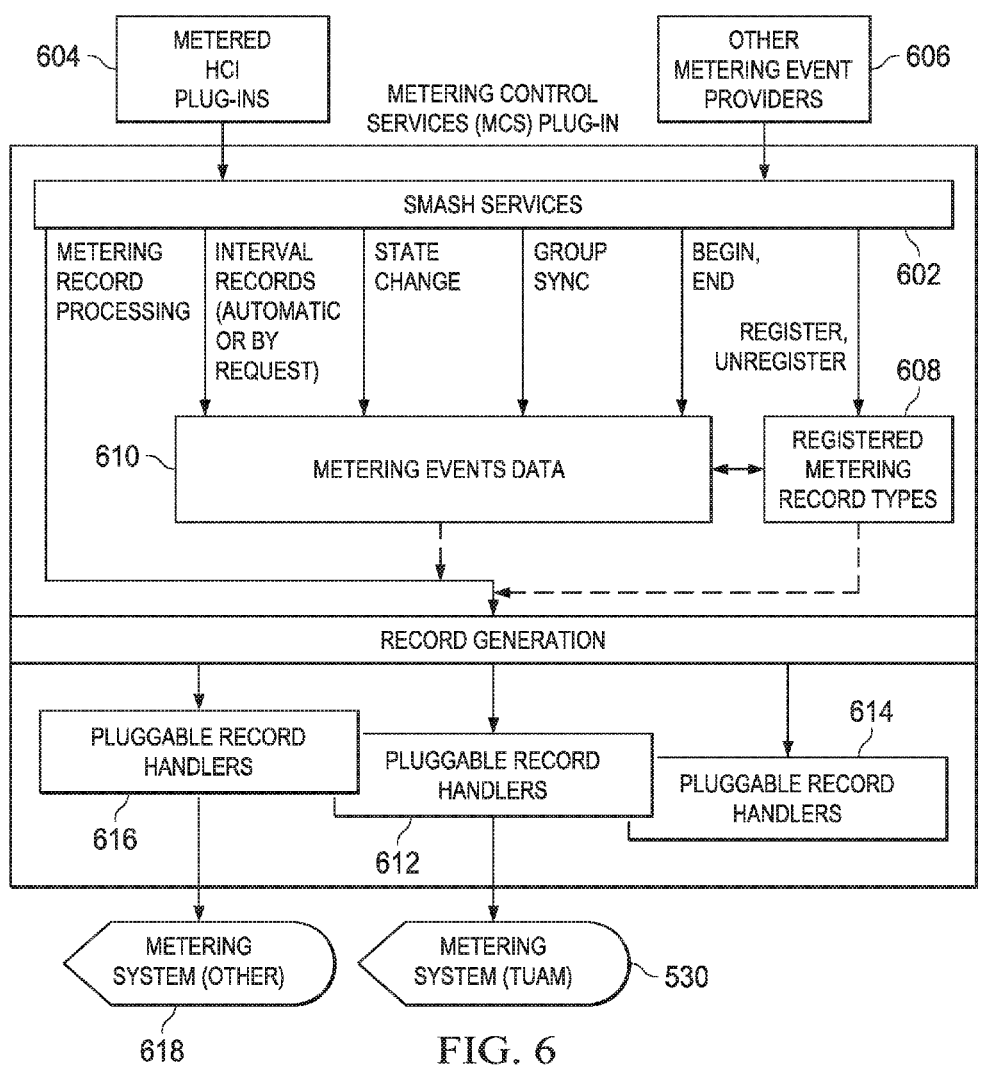
FIG. 6 is a functional block diagram showing a metering control services (MCS) plug-in for the embodiment of FIG. 5 in further detail.

Referring to FIG. 6, there is shown MCS or metering plug-in 510 in further detail. Metering plug-in 510 is capable of receiving metering events from various metering event providers through an interface such as the IBM Websphere sMash Services interface 602. The metering events can include both resource provisioning and de-provisioning events as well as resource usage events with respect to an interval. Sources of metering events include metered HCI plug-ins 604, which collectively includes cloud service broker plug-in 514 and other metering event plug-ins 516 of hybrid cloud integrator 502, as shown in FIG. 5. In addition, the sources can include other metering event providers 606. Initially, by means of the configuration GUI of the Hybrid Cloud Integrator (HCI), a user can enable or activate metering plug-in 510 to receive successive metering events, from cloud service broker plug-in 514 or other metering event sources. It is to be appreciated the configuration and activation of the metering plug-in 510 can also be performed by means other than GUI such as using command line commands, file based input of configuration data, and so on.

Each metering event that is to be sent to metering plug-in 510, from cloud service broker plug-in 514 or other source, will have an associated record type. A particular record type has a certain set of attributes such as various keys. Accordingly, before sending an event of a new record type to metering plug-in 510, the new event record type must first be registered. Metering plug-in 510 is provided with the details of a new record type through a Register Metering Record Type service call and these details are maintained in a persistent store, 608, within metering plug-in 510. For an exemplary record type, the set of attributes includes a record identifier, and also primary, state, and group keys. Record types can be registered and/or de-registered statically or dynamically by a metering service provider and/or by process of configuration of the metering plug-in 510 and/or by any other component that is relevant to service usage metering.

FIG. 6 shows that MCS or metering plug-in 510 further maintains a persistent store of metering events data 610. The metering plug-in 510 is disposed to receive certain data elements for a metering event that is sent thereto. These elements include begin and end times; group synchronization; state change; and interval records.

In regard to begin and end times, it will be appreciated that when a resource provisioning service from a cloud service provider exists or is being used for a comparatively brief period of time, the begin and end times thereof provide a very useful and precise measurement of the usage of that service. Thus, metering event data for this situation would be the begin and end times of resource service use, as indicated by time stamps or the like. However, the use of certain other cloud provisioned resource services will continue over a long period of time, such as on the order of days or even months. For resource services of these types, it would generally be impractical to use the service begin and end times as metered events, in order to determine service usage. Instead, a succession of time intervals of selected duration is used to track resource usage. Use of such intervals is described hereinafter in further detail, in connection with FIG. 9. In an embodiment using metering plug-in 510, the use of interval records can be made to be automatic or by request, for intervals of selected length.

As an example of group synchronization data elements sent to metering plug-in 510, metering plug-in 510 could be provided with a list of all resources that are in use for a particular user. Metering plug-in 510 can then compare expected metering events with event data it has actually received. This information could be used to detect exception conditions, described hereinafter. An example of a state change data element could be a modification of a resource or modification of service behavior, such as a change in the rate at which an associated resource was running or the rate at which the service was performing or a change in state from running to stopped.

Referring further to FIG. 6, metering record type data and event data stored in 608 and 610 respectively is used by metering plug-in 510 to generate metering system records by means of pluggable record handlers 612, which are included in metering plug-in 510. Metering plug-in 510 generates metering records from aggregated metering events data and calls these pluggable record handlers 612 to record these in their respective metering systems. In the example of cloud service broker plug-in 514, these records provide a measure of the usage of resource services which are provided by respective cloud service providers, in response to cloud provisioning requests sent from data center 504. Moreover, handler 612 formats and adapts the records which it prepares, such as in CSR format, for ready use by metering system 530, which usefully comprises a TUAM as described above. Metering plug-in 510 is further provided with pluggable record handlers 614 and 616, for producing records of the above type which are respectively formatted to other types of metering systems 618. Handler 612 uses metering system specific logic implemented within it or in another component in order to be able to create a record with the format acceptable by the metering system 530. Further, a handler may have a directory of formats and their related schema related to records such that these formats/schema are acceptable formats/schema for the associated metering system 530.

In addition to registering different handlers for use with different types of metering systems, metering plug-in 510 is configured to handle certain exception conditions. For example, one such condition could occur if a resource provisioning service that was previously undetected provisioned resources for a user without reporting metering events to the metering plug-in 510. In this situation, no create or start event for the resource would have been detected. However, upon becoming aware of the resource service, metering plug-in 510 would create a record to meter the use of such service, from the time it was first detected. Similarly, in another exception condition, metering plug-in 510 could determine that a previously assigned resource service had become stopped or terminated, even though a state change or end metering event for the resource had not been previously recorded. Metering plug-in 510 would then provide a record showing such termination.

While the embodiment of FIGS. 5 and 6 shows event data being pushed into metering plug-in 510, such as by cloud service broker plug-in 514 or other plug-ins, other providers of metering event data could be operated to pull such data into metering plug-in 510. These would be metering providers that ran as part of the metering plug-in 510 which actively gathered metering events from a source, for example, by polling the resource via an application interface.

Figure 7:
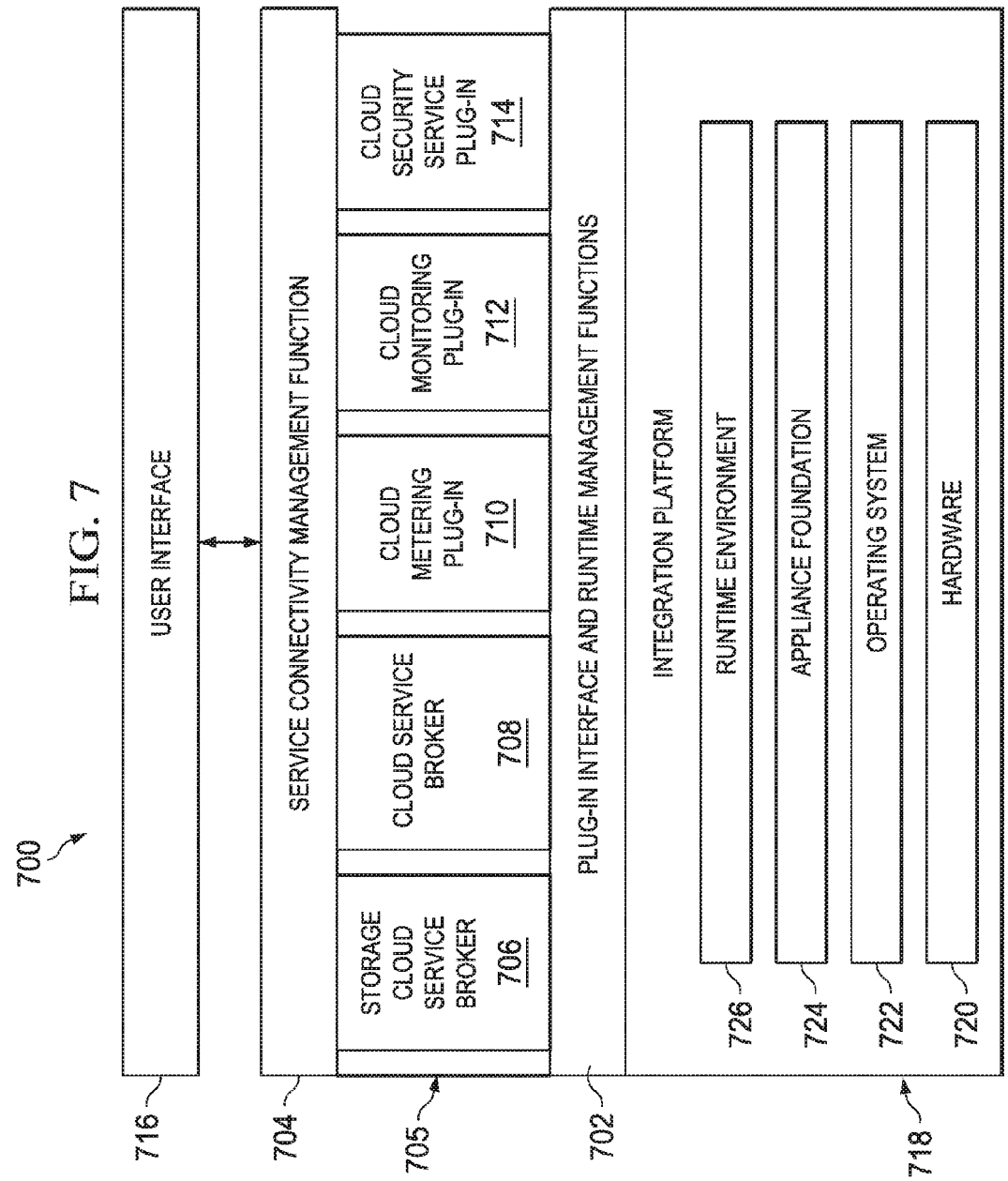
FIG. 7 is a functional block diagram showing a hybrid cloud integrator for the embodiment of FIG. 5 in further detail.

Referring to FIG. 7, a block diagram of a hybrid cloud integrator 700 is depicted which is an example of one implementation of hybrid cloud integrator 502 of FIG. 5. Hybrid cloud integrator 700 includes plug-in interface and runtime management functions 702 and service connectivity management function 704. Management function 704 may, for example, comprise an SCMP protocol. In accordance with an illustrative embodiment, plug-in interface and runtime management functions 702 and service connectivity management function 704 are implemented in software framework 705. A number of plug-ins 706, 708, 710, 712, and 714 may be installed in hybrid cloud integrator 700 and managed during runtime using plug-in interface and runtime management functions 702.

Service connectivity management function 704 provides access to plug-ins 706, 708, 710, 712, and 714 via user interface 716. Service connectivity management function 704 allows an operator to manage the configuration and other parameters of plug-ins 706, 708, 710, 712, and 714 via user interface 716. Service connectivity management function 704 may be used to obtain information about plug-ins 706, 708, 710, 712, and 714, from plug-ins 706, 708, 710, 712, and 714 via user interface 716. For example, service connectivity management function 704 may allow a user to access configuration information and other information from plug-ins 706, 708, 710, 712, and 714 via user interface 716. Service connectivity management function 704 also may be used to provide configuration data and other parameter information to plug-ins 706, 708, 710, 712, and 714 via user interface 716. For example, service connectivity management function 704 allows a user to change configuration and other parameters of plug-ins 706, 708, 710, 712, and 714 via user interface 716. In accordance with an illustrative embodiment, service connectivity management function 704 may employ a common service connectivity management protocol for interaction between plug-ins 706, 708, 710, 712, and 714 and user interface 716. Thus, service connectivity management function 704 provides a common infrastructure for configuring plug-ins 706, 708, 710, 712, and 714.

Plug-in interface and runtime management functions 702 may provide various functions for installing and managing plug-ins 706, 708, 710, 712, and 714 during runtime.

Plug-ins 706, 708, 710, 712, and 714 may include, for example and without limitation, one or more of storage cloud service broker 706, cloud service broker 708, cloud metering plug-in 710, cloud monitoring plug-in 712, and cloud security service plug-in 714. In this example, cloud service broker 708 is an example of cloud service broker plug-in 514 of FIG. 5. Also in this example, cloud metering plug-in 710 is an example of metering plug-in 510 of FIG. 5.

Hybrid cloud integrator 700 may be implemented on integration platform 718. For example, software framework 705 and plug-ins 706, 708, 710, 712, and 714 may be implemented for operation on integration platform 718. Integration platform 718 includes hardware 720. Hardware 720 may include data processing system hardware, such as computer hardware. For example, without limitation, hardware 720 may include IBM® WebSphere® Data Power 9004 1U appliance hardware. Operating system 722 runs on hardware 720. For example, without limitation, operating system 722 may include the IBM MCP 6.0 embedded LINUX® operating system. Operating system 722 supports appliance foundation 724. For example, without limitation, appliance foundation 724 may include the IBM WebSphere® BEDROCK appliance foundation. Runtime environment 726 is at the highest level of integration platform 718. For example, without limitation, runtime environment 726 may include a JAVA/sMASH runtime environment. In accordance with an illustrative embodiment, integration platform 718 may be implemented using hardware 720, operating system 722, appliance foundation 724, and runtime environment 726.

Figure 8:
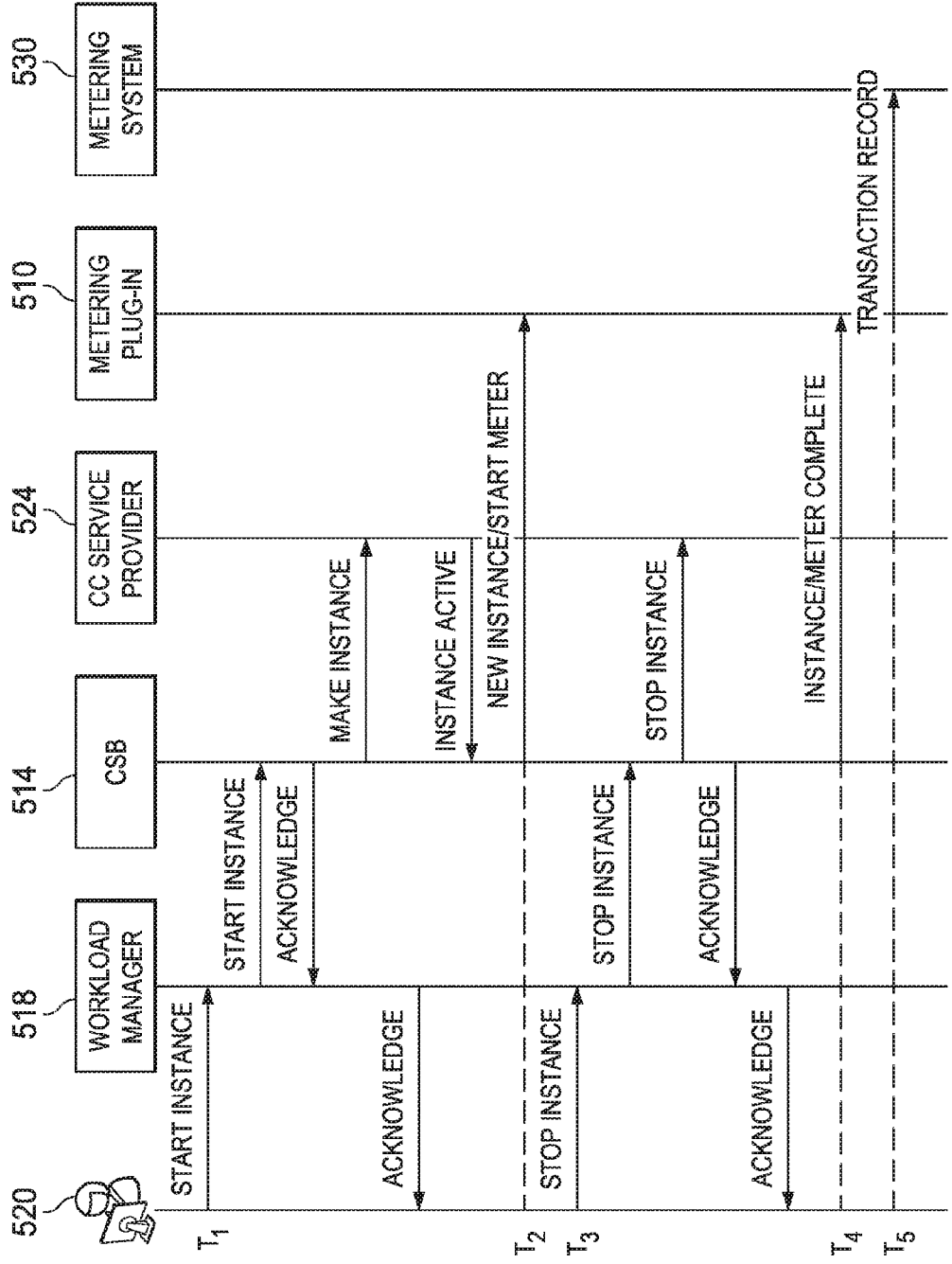
FIGS. 8, 9, and 10 are diagrams showing exemplary types of metering events related to cloud provisioning services which are used in accordance with embodiments of the invention.

Referring to FIG. 8, there is shown a timing diagram that further illustrates metering events of the types: start and stop instance, which are intercepted by the metering plug-in 510, as described above. More particularly, FIG. 8 depicts start and stop events pertaining to an instance of a resource service which is provided to a user associated with data center 504 of FIG. 5, by a specified cloud computing service provider. Also, it is anticipated that the time period between the beginning and the end of the instance of FIG. 8 will be comparatively brief. A single metering record is created after the instance is stopped.

At a time T1, a user or user 520 instructs workload manager 518 to start provisioning a resource instance using a cloud computing service provider, such as one of the providers 524. In response, workload manager 518 implements the instance by sending a cloud provision request to cloud service broker plug-in 514, as described above. The cloud service broker plug-in 514 acknowledges the request back to the user 520, and invokes the instance as requested, by communicating with cloud service provider 524. Cloud service broker plug-in 514 is notified that the instance has become active, and such notice of the start of a new instance is intercepted by metering plug-in 510, at time T2. In order to meter the accurate usage, the notice of a service instance start (as well as stop as is discussed later) includes the time at which the service instance was actually started.

Referring further to FIG. 8, at time T3 user 520 instructs workload manager 518 to stop the instance. This instruction is routed to the cloud service broker plug-in 514, which acknowledges the instruction, and also directs provider 524 to stop the instance. At time T4, metering plug-in 510 receives notice of the instance stop event from cloud service broker plug-in 514. Metering plug-in 510 thereupon generates a transaction record pertaining to the instance, which indicates the level of usage of service furnished by provider 524, and delivers the record to metering system 530 at time T5.

Figure 9:
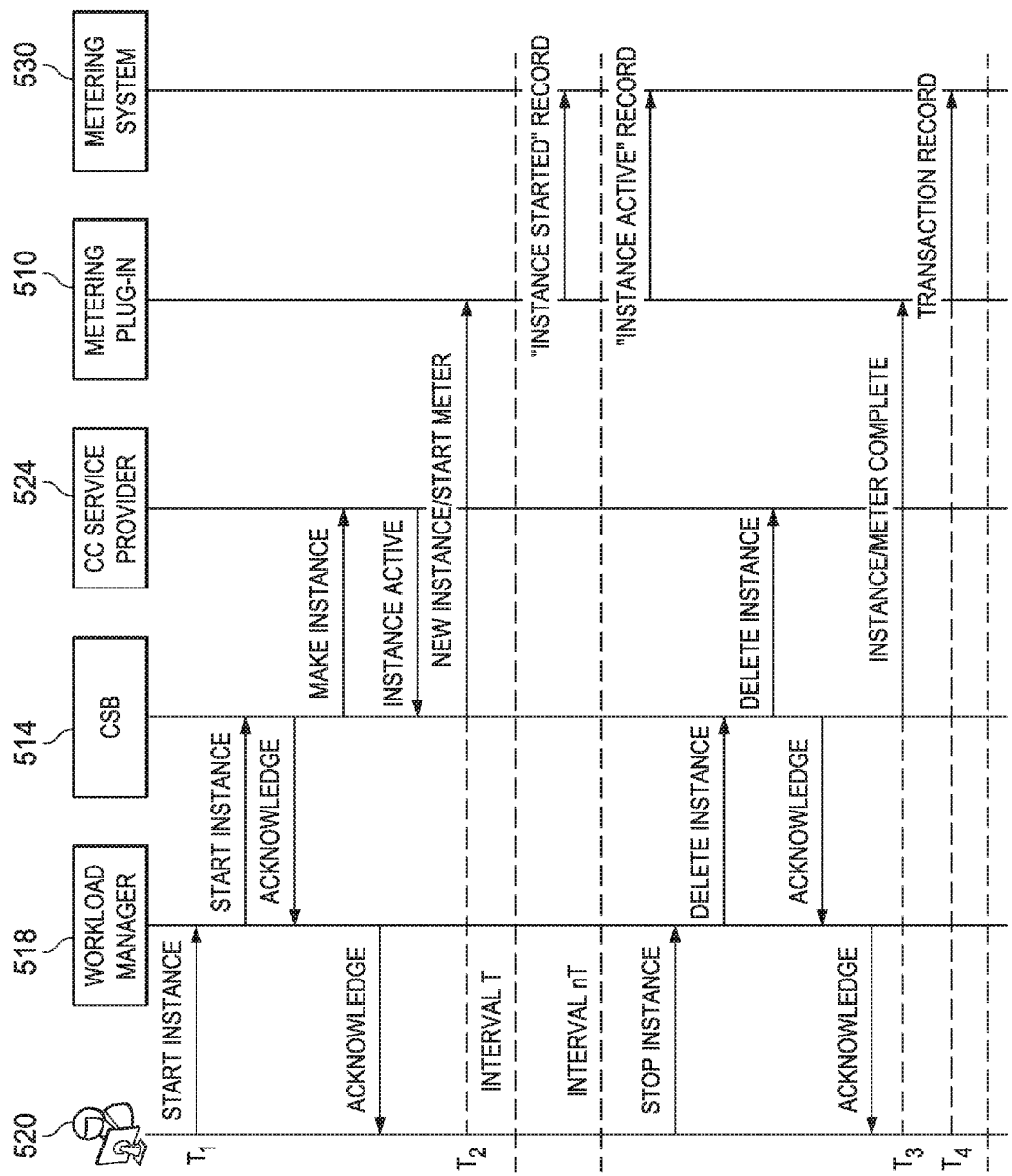

Referring to FIG. 9, there is shown a timing diagram that illustrates metering events received by metering plug-in 510, wherein it maybe essential to determine the resource usage in between the start and stop of an instance or a provisioned service. It may be anticipated that a substantial period of time will pass between the beginning event of a requested provisioning instance, and the end event thereof. Accordingly, a time period T is initially selected, for each of successive intervals when the status of the instance is to be monitored, while the instance is active. The time period T, for example, could be one hour or twenty-four hours, depending on the anticipated duration of the instance.

FIG. 9 shows that the instance, which is to be furnished by a provider 524, starts at time T1. In like manner with FIG. 8, the start of the instance is implemented by workload manager 518 and cloud service broker plug-in 514, and acknowledged back to user 520. After cloud service broker plug-in 514 receives notice that the instance has become active, metering plug-in 510 is also informed of the start of the new instance, at time T2.

Referring further to FIG. 9, it is seen that a stop instance event does not occur during the first interval T. Accordingly, at the beginning of the next following interval, metering plug-in 510 generates an "instance started" record, and sends it to metering system 530. Metering system 530 is thus informed that there is a new instance in process. At the beginning of each subsequent interval T, prior to the occurrence of a stop event for the instance, an "instance active" record is generated by metering plug-in 510 and sent to metering system 530. Metering system 530 is thus continually reminded that the instance remains active.

FIG. 9 shows that during a subsequent interval nT, where n can be any number including non-integer numbers larger than 1 and can be a reasonably large number, an instruction to stop the instance is sent from user 520 to workload manager 518. In response, the workload manager 518 and cloud service broker plug-in 514 operate to delete the instance, and acknowledge the instruction to user 520. At time T3, metering plug-in 510 receives notice of the instance stop event from cloud service broker plug-in 514. Metering plug-in 510 thereupon generates a transaction record pertaining to the instance, which indicates the level of usage of service furnished by provider 524, and delivers the record to metering system 530 at time T4. It will be appreciated that the use of fractional numbers allows for stopping an instance based on the event that the budget has become zero, or an exceptional circumstance in a data center that requires stopping of an instance, such as due to warning or removal of a malware that is spreading rapidly.

Figure 10:
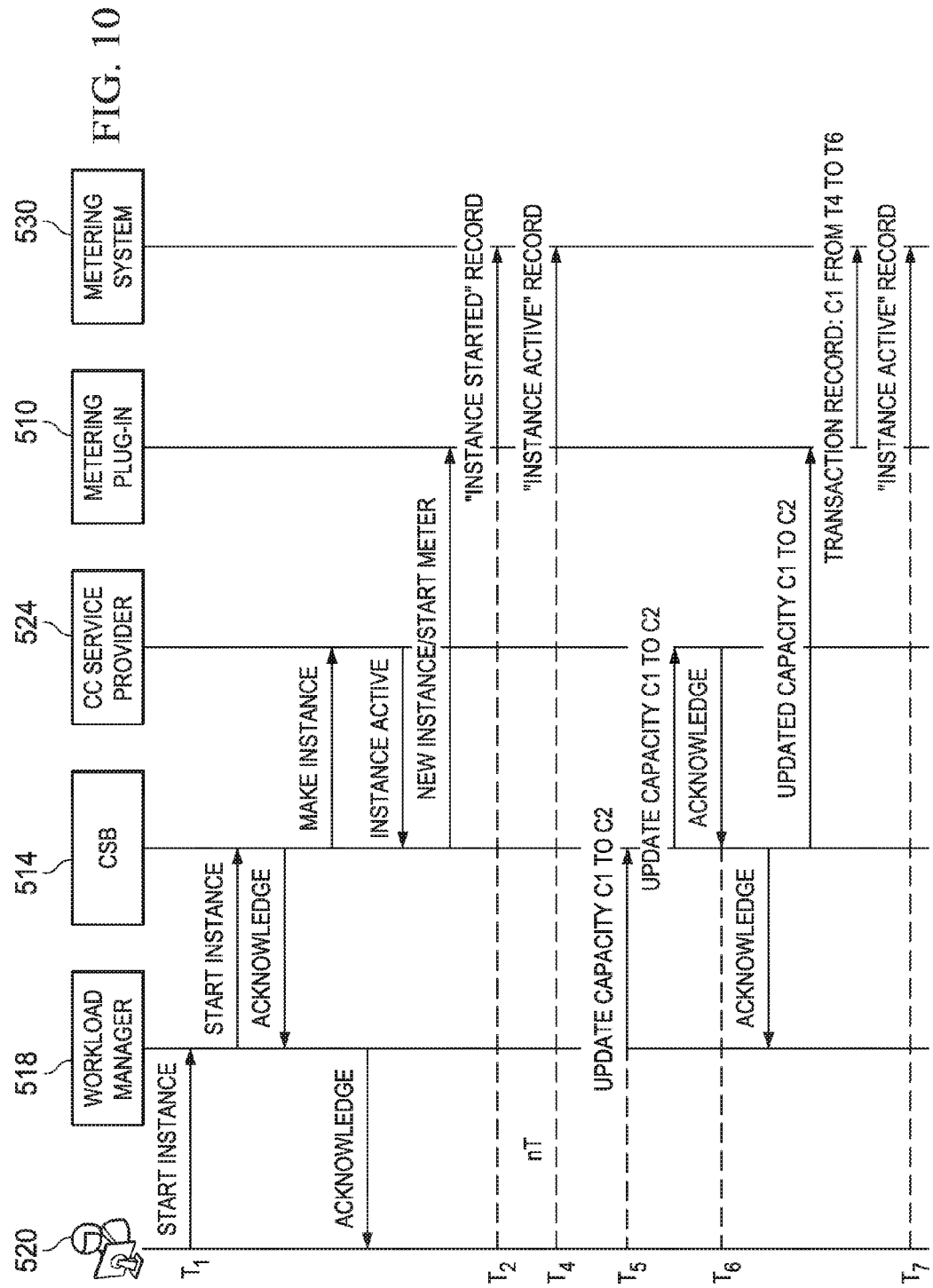

Referring to FIG. 10, as in FIG. 9, an instance is started and the time interval for creating metering records is T. In this specific scenario, the workload manager 518 sends a request to cloud service broker plug-in 514 at time T5 in order to update the capacity of the instance from existing value C1 to a new value C2. The update request may not only be specific to capacity of the instance but may be with respect to its configuration for networking, security, performance, available tools and services, location, migration, or anything that is related to a service/resource instance. The workload manager 518 may decide on whether to update and the value of C2 based on a manual, an automated or a semi-automated process. The user 520 may also provide an instruction to workload manager 518 in order to update or inspect the capacity of the instance and take necessary steps. The request from workload manager 518 maybe a result of any or a combination of the above processes. As soon as the capacity (or for that matter any other factor) is updated for the instance, cloud service broker plug-in 514 informs metering plug-in 510 about the change from C1 to C2, upon which the said metering plug-in 510 may (or may not) send a metering record related to the time duration T4 and T6 (which maybe less than an interval) to the metering system 530. If the metering plug-in 510 is configured such that it does not send such a record before the interval ends, at the end of this interval (time $T7=(n+1)T$), "instance active" record(s) is (are) sent to the metering system 530. Such a record contains the capacity C1 between time T4 and T6 and the capacity C2 between time T6 and T7.

Figure 11:
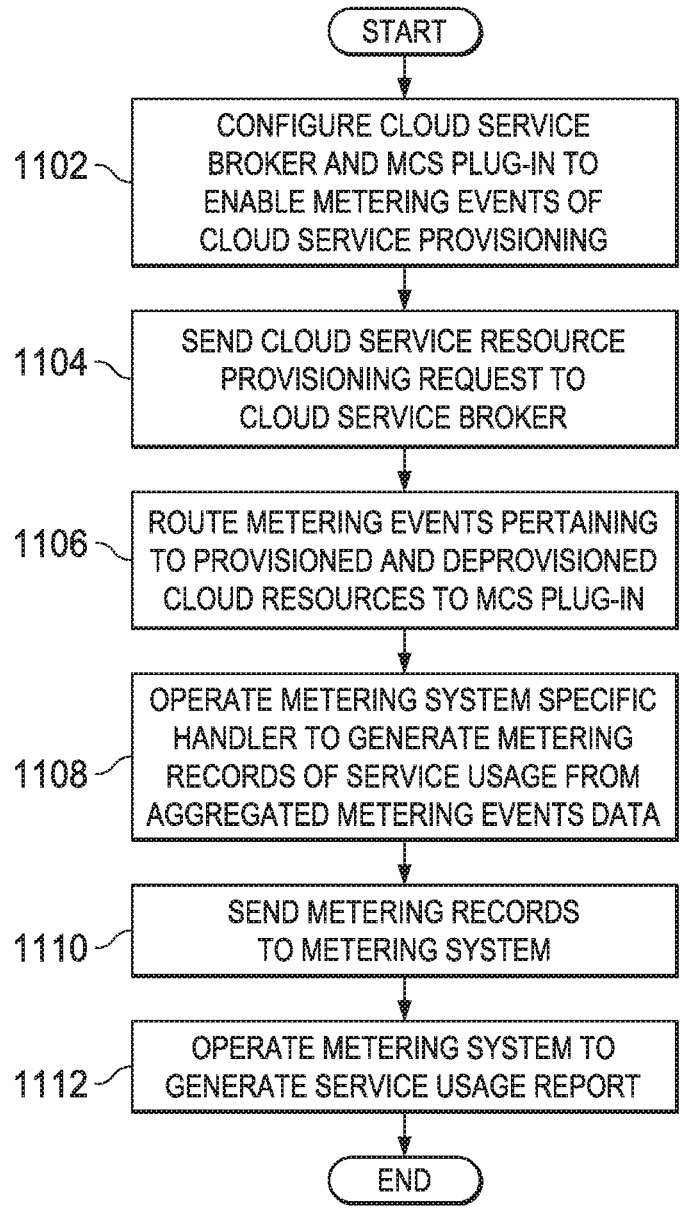
FIG. 11 is a flow chart showing steps for a method comprising an illustrative embodiment of the invention.

Referring to FIG. 11, there are shown steps for a method comprising an illustrative embodiment of the invention. At step 1102, by using the configuration GUI of the hybrid cloud integrator, the cloud service broker plug-in 514 and metering plug-in 510 of hybrid cloud integrator 502 of FIG. 5 are configured to enable acquisition of metering events which pertain to cloud service usage. For such configuration, it is necessary to provide the metering plug-in 510 with the configuration parameters used to establish a new pluggable record handler (e.g. 612) to support the target metering system being used (e.g. 530 or 618). Examples of configuration parameters include the target network address of the metering system, the details needed to load the metering records into the metering system, and the interval for which to record interval usage records for longer duration usage of resources. Further the configuration directs the metering system provider such as cloud service broker plug-in 514 to commence sending of metering events to the metering plug-in 510.

At step 1104, a cloud service resource provisioning request is sent to the cloud service broker plug-in 514. Such a request may be sent, for example, by the workload manager 518 in FIG. 5. At step 1106, metering events that pertain to provisioned and deprovisioned resource are routed to the metering plug-in 510. These steps may be respectively implemented as described above in connection with FIG. 5.

At step 1108 of FIG. 11, a metering system specific handler, such as handler 612 of FIG. 6, is operated to generate metering records of service usage from aggregated metering events data. As an example, usage for the resource provisioning instance of FIG. 8 can be determined from T2 and T5, the metered times of the instance start event and the instance termination (e.g. de-provisioned) event, respectively.

At step 1110, metering records are sent to the metering system. At step 1112, the metering system is operated to generate a service usage report, from the usage data provided by respective metering records.

Referring to FIG. 12, a block diagram of a data processing system is depicted in accordance with an illustrative embodiment. In this example, data processing system 1200 is one example of a data processing system that may be used to implement consumer data processing resources 402 and provider data processing resources 404 in FIG. 4, as well as other components for embodiments of the invention. In this illustrative example, data processing system 1200 includes communications fabric 1202, which provides communications between processor unit 1204, memory 1206, persistent storage 1208, communications unit 1210, input/output (I/O) unit 1212, and display 1214.

Processor unit 1204 serves to execute instructions for software that may be loaded into memory 1206. Processor unit 1204 may be a number of processors, a multi-processor core, or some other type of processor, depending on the particular implementation. A number, as used herein with reference to an item, means one or more items. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 also may be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for execution by processor unit 1204. The processes of the different embodiments may be performed by processor unit 1204 using computer implemented instructions, which may be located in a memory, such as memory 1206.

These instructions are referred to as program instructions, program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226. Computer readable storage media 1224 may include, for example, an optical or magnetic disk that is inserted or placed into a drive or other device that is part of persistent storage 1208 for transfer onto a storage device, such as a hard drive, that is part of persistent storage 1208. Computer readable storage media 1224 also may take the form of a persistent storage, such as a hard drive, a thumb drive, or a flash memory, that is connected to data processing system 1200. In some instances, computer readable storage media 1224 may not be removable from data processing system 1200.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1218 may be omitted because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

As another example, a storage device in data processing system 1200 is any hardware apparatus that may store data. Memory 1206, persistent storage 1208, and computer readable media 1220 are examples of storage devices in a tangible form.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system. Additionally, communications unit 1210 may include one or more devices used to transmit and receive data, such as a modem or a network adapter. Further, a memory may be, for example, memory 1206, or a cache, such as found in an interface and memory controller hub that may be present in communications fabric 1202.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a hybrid cloud environment, wherein a user of cloud computing services is disposed to consume cloud provided services delivered by each of a plurality of cloud computing service providers, a computer program product comprising a computer readable storage medium having program instructions embodied therewith, the program instructions executable by a computer to cause the computer to:

receive specified event data at a metering control service (MCS) component, wherein the event data pertains to metering events related to the cloud provided services delivered by one or more cloud service providers of said plurality of cloud computing service providers, and wherein the event data includes event data furnished by one or more entities that actively monitor metering events at one or more local or remote cloud service provider locations, and wherein the MCS component processes specified event data pertaining to a specified instance of the cloud provided services delivered by a given provider, and wherein said specified event data includes a start instance event and a stop or change instance event, and wherein said start instance event is followed by one or more intervals of selected duration, prior to an occurrence of said stop instance event, and during each interval the MCS component generates a message that indicates an existence of said specified instance of the cloud provided services delivered by the given provider;

send processed aggregated event data from the MCS component to a metering system; and operate the metering system to generate one or more reports from the processed aggregated event data that contains usage information on services provided by one or more cloud service providers of said plurality of cloud computing service providers, wherein the usage information for the given provider specifies a set of amounts and quality of each type of service that has been delivered to one or more users by the given provider.

2. The computer program product of claim 1, wherein:
the MCS component derives aggregated event data from monitored metering events.

3. The computer program product of claim 1, wherein:
the processed aggregated event data is sent from the MCS component to the metering system either at selected times, in response to detection of specified events, or both at selected times and in response to specified events, selectively.

4. The computer program product of claim 1, wherein:
the MCS component is deployed in a standalone environment, or on specified platforms, selectively, wherein one of said specified platforms comprises a hybrid cloud integrator provided with a framework having a plug-in interface, and the MCS component comprises a plug-in installed in the hybrid cloud integrator by means of said plug-in interface.

5. The computer program product of claim 4, wherein:
one or more event source plug-ins are installed in the hybrid cloud integrator, wherein the MCS component acquires metering events from any of the one or more event source plug-ins.

6. The computer program product of claim 4, wherein:
the MCS component obtains metering events and aggregated information directly from one or more of the cloud service providers of said plurality of cloud computing service providers.

7. The computer program product of claim 5, wherein:
one of the one or more event source plug-ins comprises a cloud service broker, the cloud service broker receives cloud service requests from an on-premise workload manager and routes different cloud provisioning and change requests to different off-premise service providers of said plurality of cloud computing service providers, wherein the cloud service broker monitors the metering events associated with cloud provided services delivered by said off-premise service providers in response to said cloud provisioning requests and enables said MCS component to acquire said monitored metering events.

8. The computer program product of claim 1, wherein:
each of said metering events is a type of event selected from a group of event types that include at least provisioning events and service lifecycle events related to changes in a service capacity, service performance, service behavior, service delivery method, and service termination.

9. The computer program product of claim 1, wherein:
the MCS component has a handler that processes aggregated event data to generate corresponding usage records which are formatted for use by the metering system, wherein a given usage record specifies the usage of the cloud provided services delivered by the given provider.

10. The computer program product of claim 9, wherein:
the metering system combines respective usage records with usage information pertaining to on-premise cloud computing services to generate a unified usage report.

11. The computer program product of claim 1, wherein:
the MCS component processes exception conditions, wherein a first exception condition occurs in response to the MCS component detecting an existence of an active first provisioning instance and did not previously receive create or start instance event data pertaining to said active first provisioning instance, and wherein a second exception occurs in response to the MCS component detecting a termination of a previously active second provisioning instance and did not previously receive stop or delete instance data pertaining to said previously active second provisioning instance.

12. The computer program product of claim 11, wherein:
a third exception occurs in response to the MCS detecting that a capacity of an active provisioning instance is updated and did not previously receive an "updated capacity" event pertaining to said active provisioning instance.

* * * * *